(12) United States Patent
Väre et al.

(10) Patent No.: US 7,330,726 B2
(45) Date of Patent: Feb. 12, 2008

(54) DETERMINING GEOGRAPHICAL POSITION IN IPV6 NETWORKS

(75) Inventors: Jani Väre, Kaarina (FI); Kari Virtanen, Merimasku (FI)

(73) Assignee: Spyder Navigation LLC, Wilmington, DE (US)

( * ) Notice: Subject to any disclaimer, the term of this patent is extended or adjusted under 35 U.S.C. 154(b) by 132 days.

(21) Appl. No.: 10/862,301

(22) Filed: Jun. 7, 2004

(65) Prior Publication Data

US 2005/0272421 A1  Dec. 8, 2005

(51) Int. Cl.
*H04Q 7/20* (2006.01)
(52) U.S. Cl. .................... 455/432.2; 455/414.2
(58) Field of Classification Search .......... 455/456.2, 455/432.2, 456.1, 414, 440, 456.3, 414.2, 455/404.2
See application file for complete search history.

(56) References Cited

U.S. PATENT DOCUMENTS

| | | | |
|---|---|---|---|
| 4,939,726 | A | 7/1990 | Flammer et al. |
| 5,115,433 | A | 5/1992 | Baran et al. |
| 5,594,947 | A | 1/1997 | Grube |
| 6,157,621 | A | 12/2000 | Brown et al. |
| 6,522,883 | B2 * | 2/2003 | Titmuss et al. ............ 455/445 |
| 6,931,254 | B1 * | 8/2005 | Egner et al. ............ 455/456.3 |
| 2001/0015965 | A1 | 8/2001 | Preston |
| 2002/0006133 | A1 * | 1/2002 | Kakemizu et al. .......... 370/401 |
| 2002/0154638 | A1 | 10/2002 | Shahrier et al. |
| 2002/0155825 | A1 | 10/2002 | Haumont et al. |
| 2003/0022676 | A1 * | 1/2003 | Nakamoto et al. .......... 455/456 |
| 2003/0028763 | A1 * | 2/2003 | Malinen et al. ............ 713/155 |
| 2003/0073445 | A1 | 4/2003 | Chen |
| 2003/0114981 | A1 * | 6/2003 | Allen et al. ................. 701/213 |

(Continued)

FOREIGN PATENT DOCUMENTS

EP  1261221  * 11/2002

(Continued)

OTHER PUBLICATIONS

Jani Väre, et al., "Geographical Positioning Extension for IPv6", International Conference on Networking (ICN'04); Guadeloupe; French Caribbean Feb. 29-Mar. 4, 2004, IEEE. Retrieved from the Internet 20051017, http://europe.nokia.com/nokia/0,,49410,0.html?id=461 Chapters 3 and 4.

*Primary Examiner*—Duc M. Nguyen
*Assistant Examiner*—Chuck Huynh
(74) *Attorney, Agent, or Firm*—Foley & Lardner LLP

(57) ABSTRACT

The present invention provides methods and apparatus for including geographical information of a target node in a geographical response message when requested by a requesting node. Geographical messages are supported at higher layer protocol. The geographical messaging may be included in an IPv6 datagram that supports a data payload and the geographical information in an extension header. An embodiment of the invention supports messaging that is associated with the Internet Control Message Protocol (ICMP) and that is compatible with IPv6 specifications. The requesting node may insert the geographical position of the requesting node when sending a request to the target node. Both peer-to-peer and client-server architectures may be supported. A node may provide geographical-based information that comprises geographical coordinates or other variations of the geographical-based information. Moreover, a node may include non-geographical information that is associated with the node.

39 Claims, 22 Drawing Sheets

U.S. PATENT DOCUMENTS

| | | |
|---|---|---|
| 2004/0004967 A1 | 1/2004 | Nakatsugawa et al. |
| 2004/0068462 A1 | 4/2004 | Katz |
| 2004/0092271 A1* | 5/2004 | Viikari et al. ............ 455/456.2 |
| 2004/0120323 A1* | 6/2004 | Viikari et al. ............ 370/395.5 |
| 2004/0132465 A1* | 7/2004 | Mattila et al. ........... 455/456.1 |
| 2004/0137888 A1 | 7/2004 | Ohki |
| 2004/0141524 A1* | 7/2004 | Lee et al. ................... 370/469 |
| 2004/0157619 A1 | 8/2004 | Corson et al. |
| 2004/0221154 A1 | 11/2004 | Aggarwal |
| 2004/0264461 A1* | 12/2004 | Janneteau et al. .......... 370/390 |

FOREIGN PATENT DOCUMENTS

| | | |
|---|---|---|
| WO | WO 01/22656 | 3/2001 |
| WO | WO 0122656 | 3/2001 |
| WO | WO 03034765 | 4/2003 |
| WO | WO 2005024545 | 3/2005 |

\* cited by examiner

| Service name | coordinates | radius (m) |
|---|---|---|
| Service 1 | x,y,z | 1000 |
| Service 2 | x2,y2,z2 | 1500 |
| Service 3 | x3,y3,z3 | 2000 |
| Terminal Node | x4,y4,z4 | 3000 |

FIG. 21

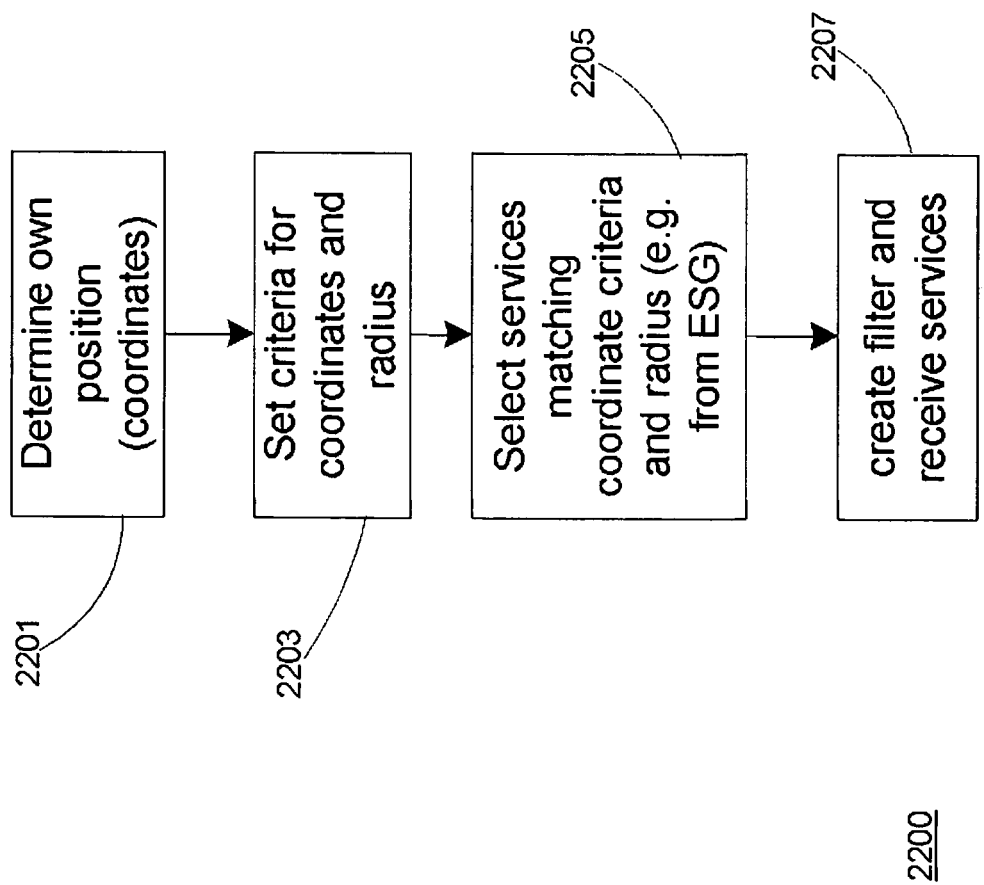

us 7,330,726 B2

DETERMINING GEOGRAPHICAL POSITION IN IPV6 NETWORKS

FIELD OF THE INVENTION

The present invention relates to supporting geographical-based services in a communications system for a node. In particular, the invention relates to apparatus and methods in which a node provides geographical information in a reply message to a request from another node.

BACKGROUND OF THE INVENTION

Communication terminals are becoming increasingly portable while the supported services are becoming increasingly complex and diverse. Moreover, users require services that are based upon the location of the user. 911 emergency services is a ubiquitous example. Moreover, the number of geographical-based services is becoming more prevalent for non-emergency purposes. With mobile users carrying video-capable wireless terminals, for example, these users may wish to obtain information about restaurants in the local vicinity. By including the geographical position of the user's terminal with specific characteristics of the restaurant (e.g., type of cuisine and price range), a content server may provide a menu of a specific restaurant on the terminal's video display. The number of potential geographical-based services is staggering and is only limited by an entrepreneur's imagination.

With the prior art, geographical-based services are typically limited. For example, with Internet Protocol (IP) capable terminals, the location of a user is often predicated on the associated IP address. However, there may be a low correlation between the location and the value of the IP address, particularly if the IP address is static. Thus, deriving the location from the IP address may be very inaccurate. Also, with some wireless standards, such as Global System for Mobile Communications (GSM) and Universal Mobile Telecommunications System (UMTS), if a wireless terminal does have locating capabilities, position information may be included in signaling messages that are distinct from messages that contain associated data payloads.

Moreover, specific applications typically support associated services. With geographical-based services, solutions are typically implemented within the application layer or within the physical layer and require special software and interaction with the operator at all the associated nodes.

Thus, there is a real need in the industry to provide methods and apparatuses for supporting geographical-based services that integrate geographical information with existing messaging and that is flexible. For example, geographical-based services should operate transparently even though the geographical-based services may be implemented on different platforms and architectures, including hybrid systems. Moreover, it is desirable that methods and apparatuses facilitate the interfacing of geographical-based applications with the physical layer through intermediate layers such as the network layer and transport layer.

BRIEF SUMMARY OF THE INVENTION

An aspect of the present invention provides methods and apparatus for including geographical information of a target node in a geographical response message when requested by a requesting node. Nodes may be implemented in a variety of forms including wireless terminals, laptop computers, and fixed-location telephones. The associated geographical messaging may be included in a datagram that supports both a data payload and geographical information. An embodiment of the invention supports a header extension that is compatible with IPv6 specifications, in which a geographical position, velocity information, and uncertainty information about the geographical position and the velocity information of a node are contained in a destination options header or a hop-by-hop header. The header extension is included in the datagram and may be included in a geographical message.

With another aspect of the invention, geographical messages are supported by a higher layer protocol. An embodiment of the invention supports messaging that is associated with the Internet Control Message Protocol (ICMP) and that is compatible with IPv6 specifications. With another variation of the embodiment, the requesting node may insert the geographical position of the requesting node when sending a request to the target node.

With another aspect of the invention, geographical-based systems supporting a peer-to-peer architecture are supported. A source node sends a geographical position request to a target node through the geographical-based network in order to obtain the geographical position of the target node. The target node responds to the request by returning its geographical position to the source node. The source node may send a request to a plurality of target nodes by using multicast addressing. Additionally, a target node may provide the geographical position to a source node without the source node sending a request to the target node.

With another aspect of the invention, geographical-based systems supporting a client-server architecture are supported. A service node functions as a server that supports a geographical-based service by collecting geographical position information and/or non-geographical information from plurality of target nodes. The service node provides relevant geographical information to a source node (that functions as a client) when requested by the source node.

With another aspect of the invention, a node may provide geographical-based information that comprises geographical coordinates. The node may provide other variations of the geographical-based information that includes a street address in addition to or in lieu of the geographical coordinates. Moreover, a node may include non-geographical information that is associated with the node.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 21 represents a service configuration that is associated with an Electronic Service Guide (ESG) of a communications system that supports geographical-based services in accordance with an embodiment of the invention; and FIG. 22 shows a flow diagram for the node, as shown in FIG. 20, in accordance with an embodiment of the invention.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
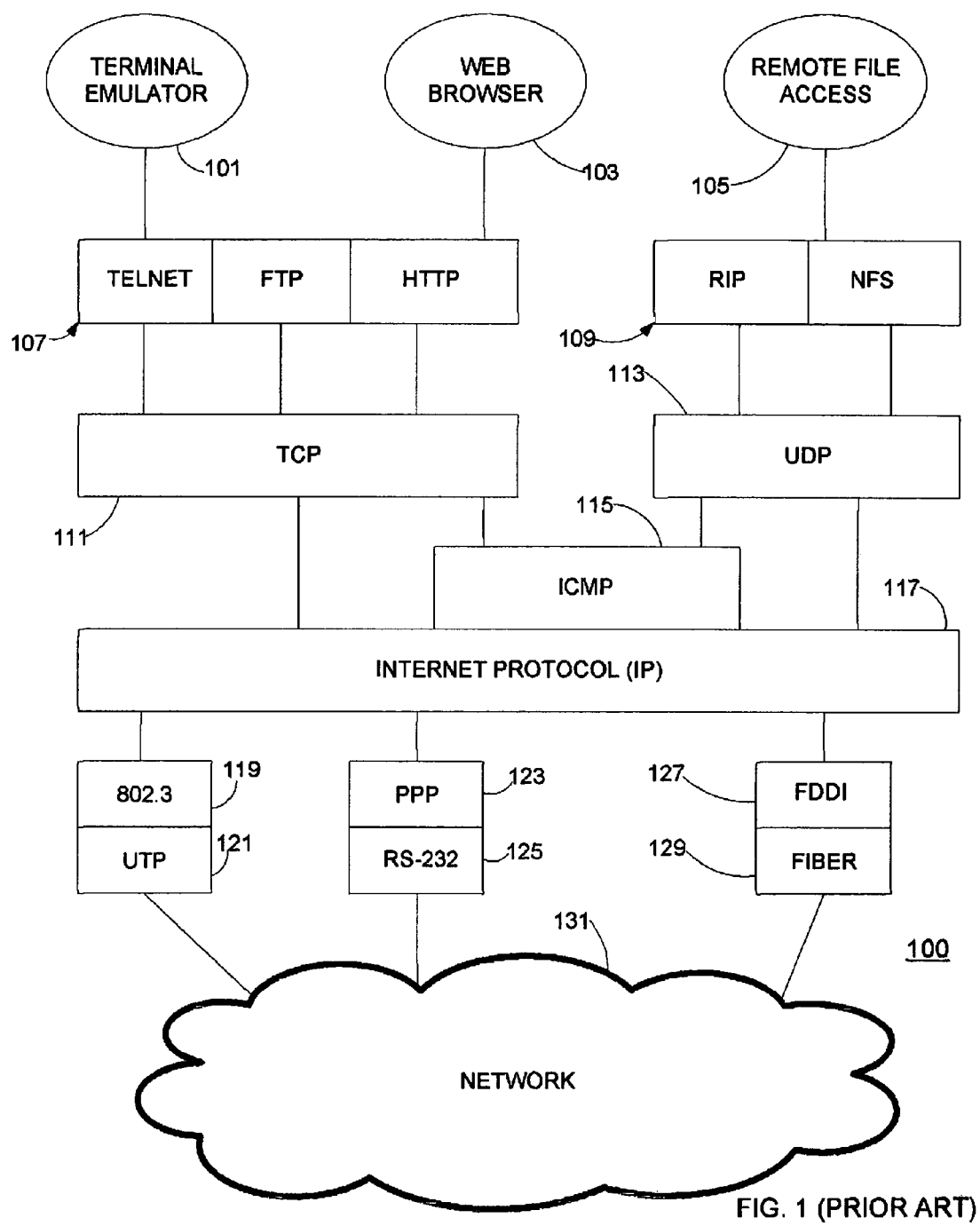
FIG. 1 shows an Internet reference model in accordance with prior art.

FIG. 1 shows an Internet reference model 100 in accordance with prior art. Internet model 100, as embodied in the TCP/IP suite of protocols, resembles but varies slightly from the OSI model. User interfaces 101, 103, and 105 interface to applications 107 and 109 (corresponding to an applications layer). Applications 101, 103, and 105 interface to the transport layer (TCP 111 and UDP 113) providing an IP payload that is contained in IP datagram. The IP datagram is supported by the Internet Protocol 117 (which corresponds to the network layer). Internet Protocol 117 interfaces to network 131 through the link layer (119, 123, or 127) and the physical layer (121, 125, and 129).

The Internet Control Message Protocol (ICMP) 115, which is specified in RFC 792 (The Internet Engineering Task Force, "Internet Control Message Protocol"), defines a set of error and control messages that provide indications that errors have occurred in the transmission of an IP packet. Other ICMP messages provide diagnostic information to a requesting node. As shown in FIG. 1, ICMP 115 is typically associated with IP 117 and depends on the support of IP to function. ICMP 115 is higher in the protocol hierarchy, even though ICMP 115 is associated somewhere between the network layer (third layer) and the transport layer (fourth layer). In the description herein, ICMP 115 is associated with the third plus layer. All associated protocols that are as high or higher in the protocol hierarchy are considered as being higher layer protocols.

The Internet Control Message Protocol as specified in RFC 792 does not support geographical-based services. For example, ICMP informational messages do not currently accommodate geographical position information.

Figure 2:
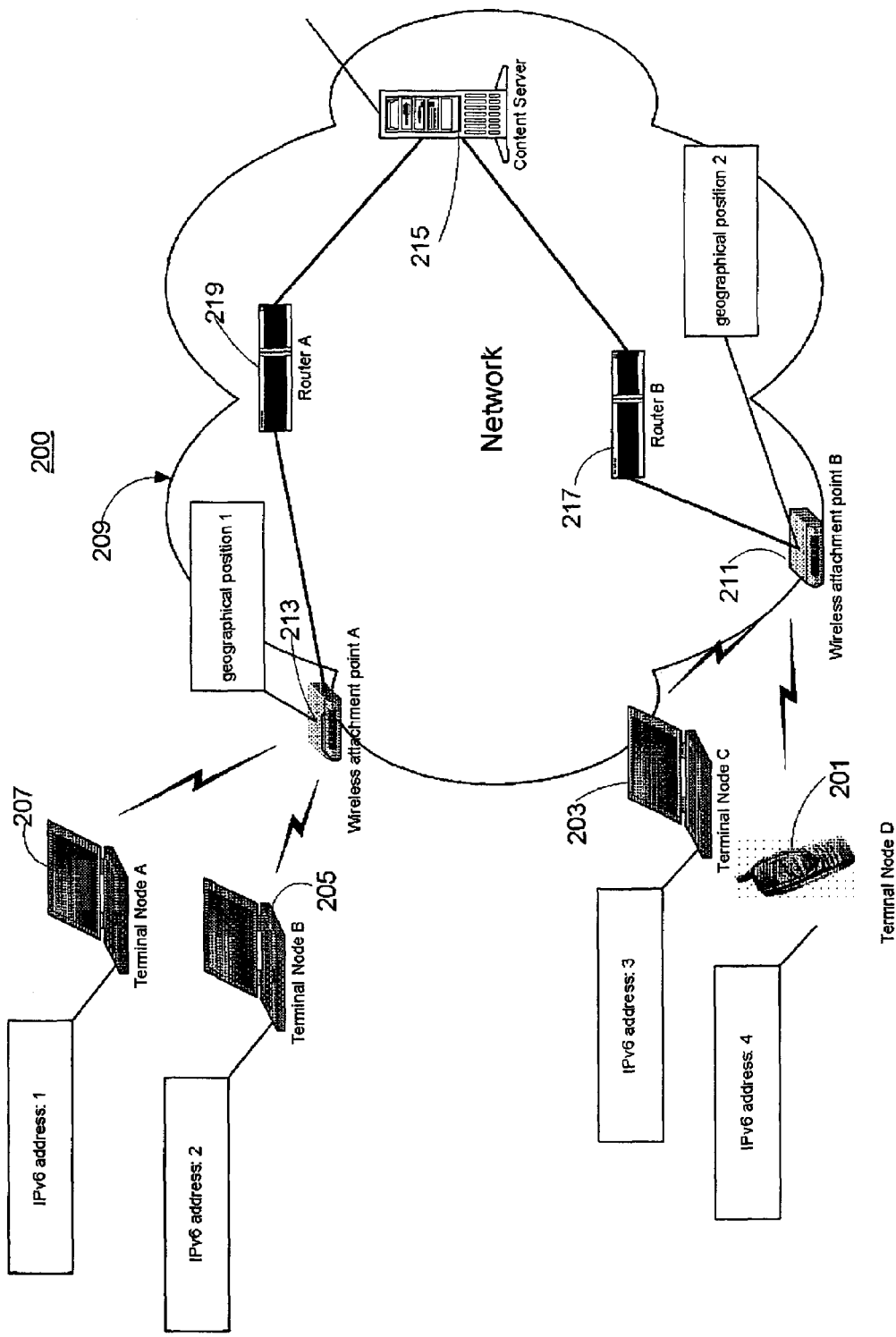
FIG. 2 shows an architecture of a communications system that supports a geographical-based service in accordance with an embodiment of the invention.

FIG. 2 shows an architecture of a communications system 200 that supports a geographical-based service in accordance with an embodiment of the invention. As an example, a node 207 establishes a data connection to a wireless attachment point 213, which provides access for node 207 to a network 209. Network 209 supports geographical-based services for nodes 201-207. (Wireless attachment point 213 provides access for nodes 205 and 207, while a wireless attachment point 211 provides access for nodes 201 and 203.) Wireless attachment point 213 may be implemented in a number of ways, including a wireless local area network (WLAN) access point, a router, a hub, a bridge, a BlueTooth access point, and a base station of a wireless system. The base station may support different wireless standards, including General Packet Radio Service (GPRS) and Universal Mobile Telecommunications System (UMTS). A node (e.g., nodes 201-207) may correspond to different terminal types, including a mobile phone or a computer, such as a laptop or personal computer (PC) that may change location or that may be stationary. Also, the node may interact with network through a communications channel, including a wireless communications channel, a dial-up telephone connection, and a cable connection.

In the exemplary embodiment, node 207 comprises a mobile node that communicates to network 209 over a wireless communications channel. In the embodiment, node 207 transmits and receives IPv6 datagrams that support a geographical-based service, although other embodiments of the invention may support datagrams with another format. The IPv6 datagrams are compatible with RFC 2460 (e.g., Internet Protocol, Version 6, December 1998). Moreover, the embodiment additionally utilizes an extension header to provide geographical information in the datagram. The geographical information includes a geographical position that is associated with node 207. For example the geographical position may comprise the approximate location of node 207. The geographical information may include other information such as a velocity of node 207. The geographical information is explained in greater detail in the context of FIGS. 9 and 10. In the following discussion, a geographical extension header that contains geographical position data, e.g., as latitude, longitude, and altitude, is referred as a GPIPv6 header.

In the embodiment, datagrams from node 207 are routed from wireless attachment point 213 through a router 219 to a content server 215. From the geographical position of node 207, content server 215 determines what services can be supported for node 207. For example, communications system 200 may be configured to support different services in different serving areas. In the exemplary embodiment shown in FIG. 2, nodes 205 and 207 are approximately located at geographical position 1 and nodes 201 and 203 are approximately located at geographical position 2. (In the embodiment, the geographical position is provided by the node. However, in other embodiments, the geographical position may be inserted by an entity of the serving network, e.g., attachment point 213.) Content server 215 parses the geographical position and associates a corresponding IPv6 source address with the geographical position. In addition, content server 215 associates services and/or announcements with the IPv6 address of node 207. Table 1 illustrates an exemplary mapping of the IPv6 addresses of nodes 201-207 to the corresponding geographical positions, services and announcements.

TABLE 1

Service Configuration

| IPv6 address | Geographical position | Services | Announcements |
|---|---|---|---|
| 1 | 1 | Service set 1 | Set 1 |
| 2 | 1 | Service set 1 | Set 1 |
| 3 | 2 | Service set 2 | Set 2 |
| 4 | 2 | Service set 2 | Set 2 |

Figure 3:
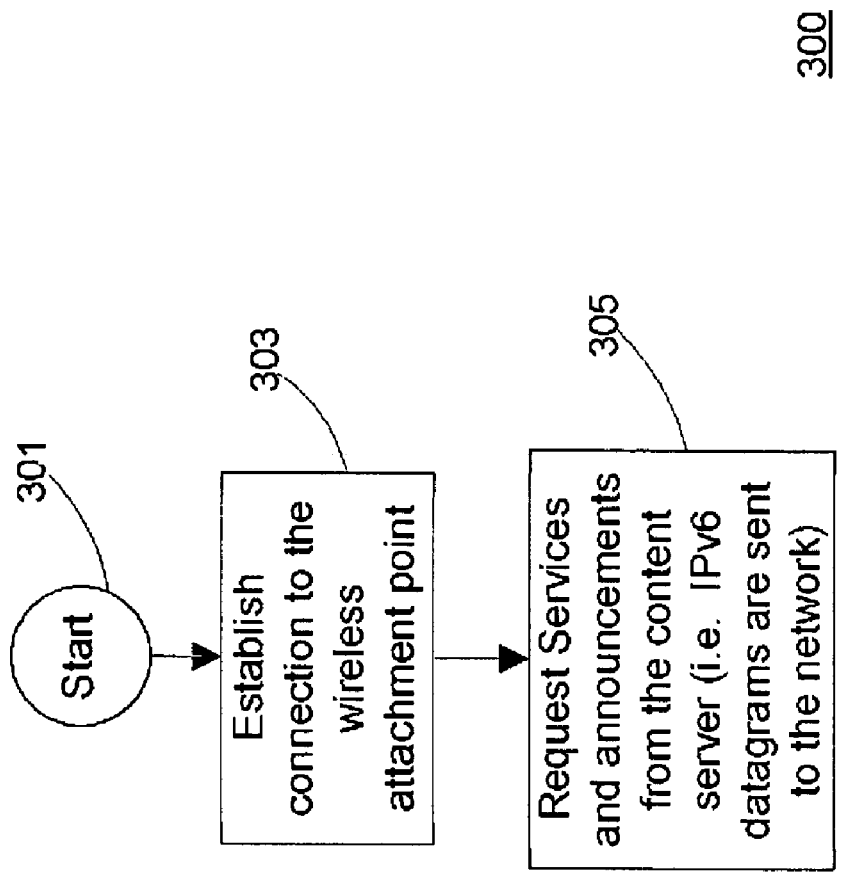
FIG. 3 shows a flow diagram for a node, as shown in FIG. 1, in accordance with an embodiment of the invention.

FIG. 3 shows a flow diagram 300 for a node (e.g., node 207), as shown in FIG. 2, in accordance with an embodiment of the invention. Step 301 starts process 300. In step 303, node 207 establishes a connection to attachment point 213. In step 305, a datagram that contains the geographical position of node 207 is transmitted from node 207 requesting for services and announcements from content server 215.

Figure 4:
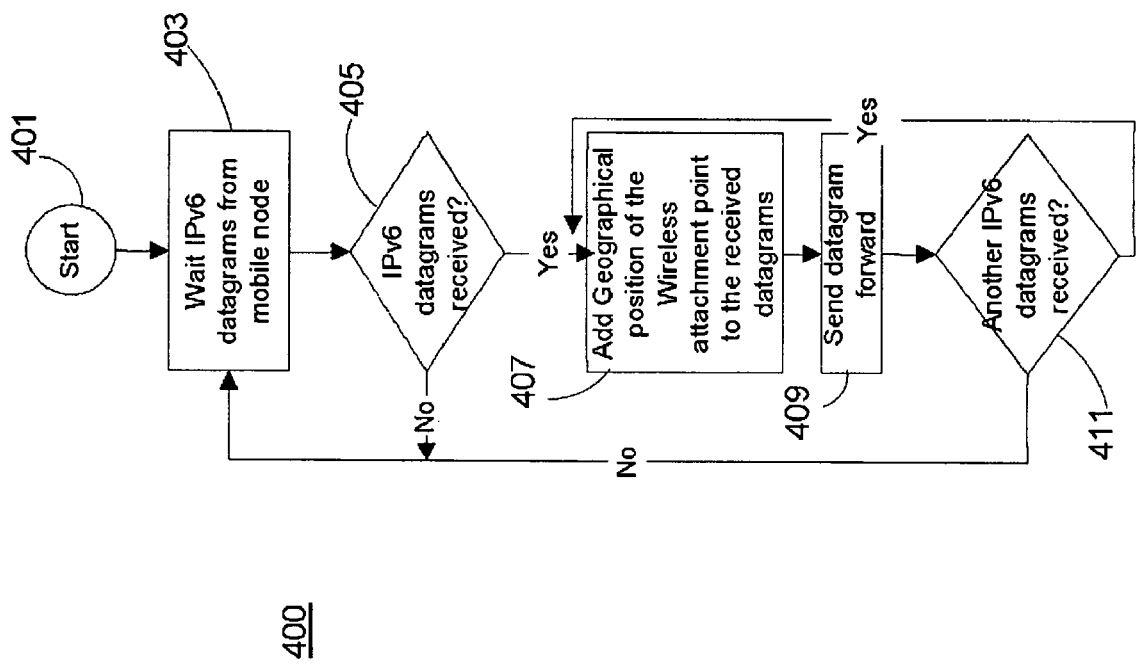
FIG. 4 shows a flow diagram for an access point, as shown in FIG. 1, in accordance with an embodiment of the invention.

FIG. 4 shows a flow diagram 400 for an access point (e.g., wireless attachment point 213), as shown in FIG. 2, in accordance with an embodiment of the invention. Step 401 starts process 400. In step 403, the access point waits for a datagram from node 207. If a datagram is received from node 207, as determined by step 405, wireless attachment point 213 determines if a geographical position has been inserted by node 207. If not, wireless attachment point 213 inserts a geographical position that corresponds to the location of wireless attachment point 213 in step 407. In step 409, the datagram is forwarded to the content server, as designated in the destination address of the datagram, through router 219. Process 400 is repeated for the next received datagram in step 411.

Figure 5:
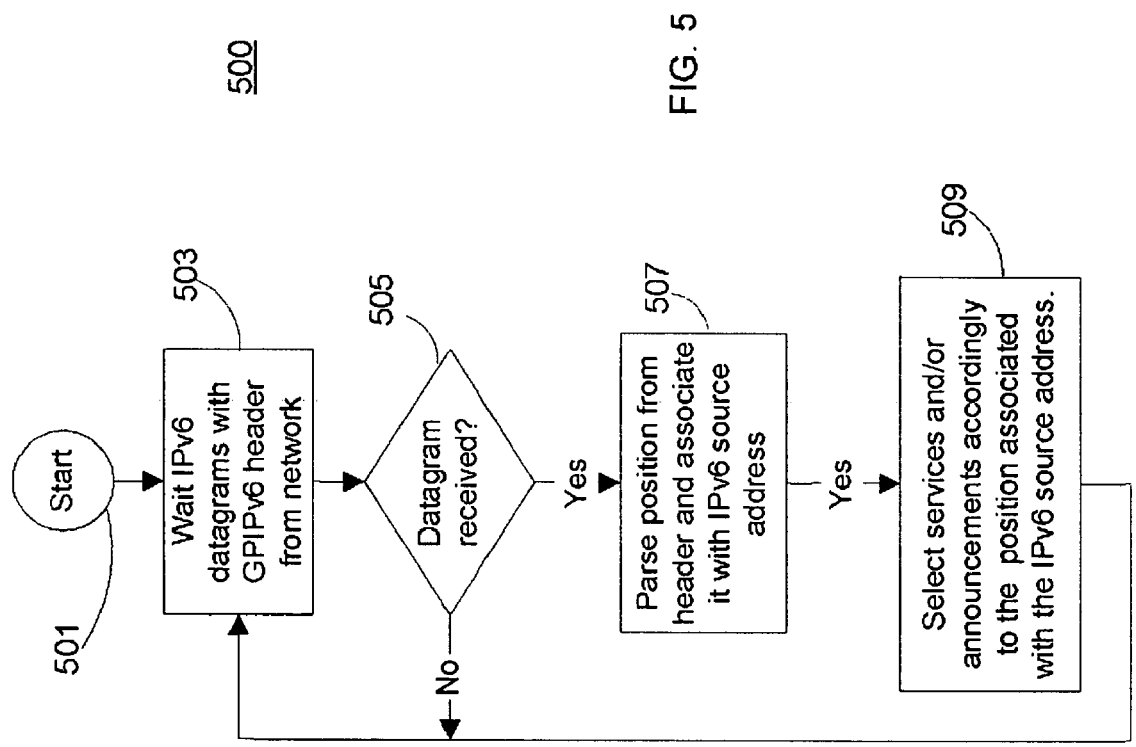
FIG. 5 shows a flow diagram for a content server, as shown in FIG. 1, in accordance with an embodiment of the invention.

FIG. 5 shows a flow diagram 500 for a content server (e.g., content server 215), as shown in FIG. 2, in accordance with an embodiment of the invention. Step 501 starts process 500. In step 503, content server 215 waits for a datagram with a GPIPv6 header. If such a datagram is received, as determined by step 505, content server 215 parses the geographical position data and associates the determined position with the IPv6 source address (that is contained in the IP datagram), which corresponds to node 207 in step 507. In step 509, content server 215 associates available services and announcements that are available to node 207 for the geographical position of node 207 (as illustrated in Table 1).

Figure 6:
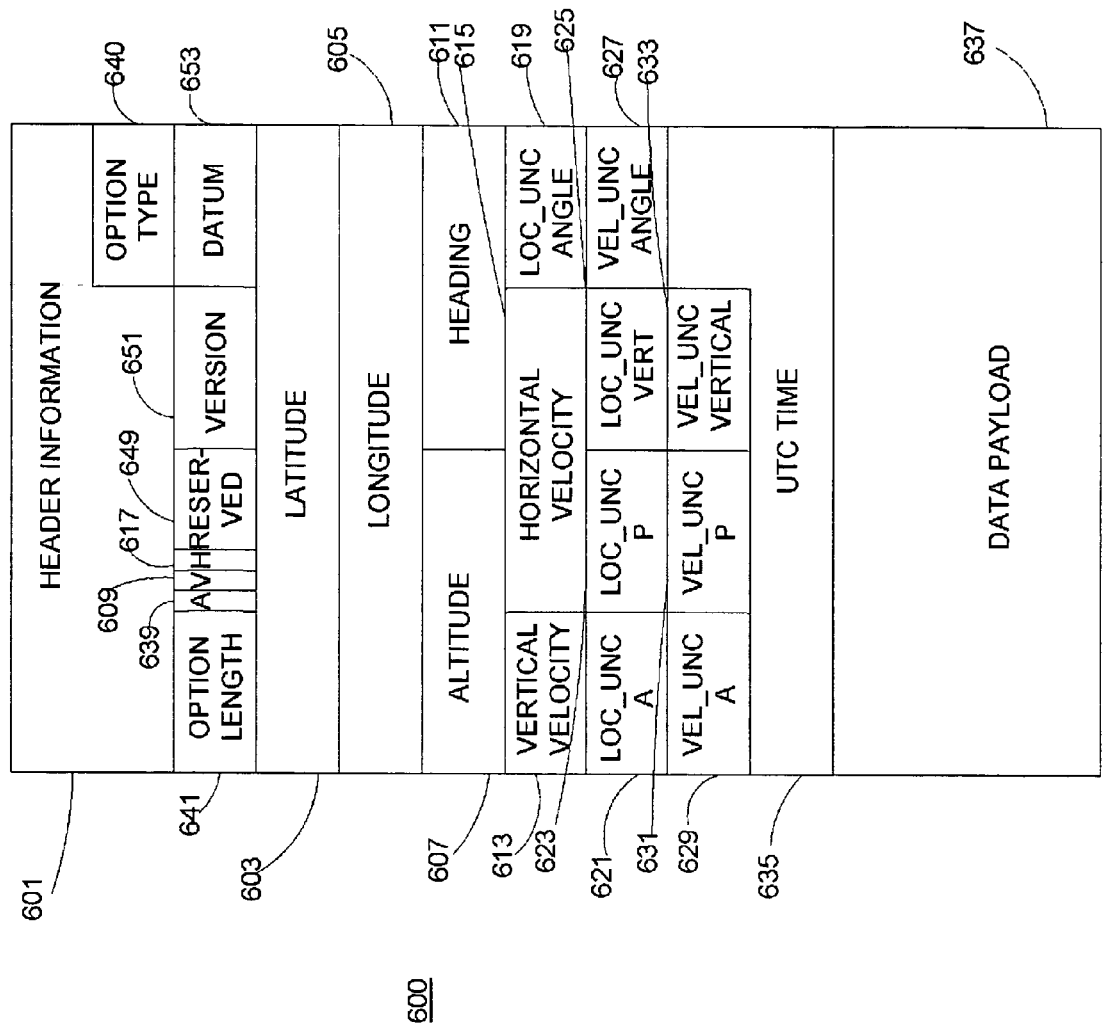
FIG. 6 shows a first exemplary layout of a message that supports a geographical-based service in accordance with an embodiment of the invention.

FIG. 6 shows an exemplary layout of a message 600 that supports a geographical-based service in accordance with an embodiment of the invention. Datagram 600 comprises header information 601 (such as the source IP address and the destination address) and data payload 637. Also, datagram 600 comprises geographical position information about a source device corresponding to a option type data field 640, an option length data field 641, a reserved data field 649, a version data field 651, a datum data field 653, a latitude data field 603, a longitude data field 605, an altitude data fields 607 and 639, velocity data fields 609, 611, 613, and 615, location uncertainty data fields 617, 619, 621, 623, and 625, velocity uncertainty data fields 627, 629, 631, and 633, and time data field 635. Time data field 635 is a 40-bit field that contains the current time and data in Coordinated Universal Time (UTC) and Modified Julian Date (MJD). Field 635 is coded as 16 bits providing 16 LSBs of the MJD followed by 24 bits that represent 6 digits in a 4-bit Binary-Coded Decimal (BCD). In the exemplary embodiment, the geographical information is contained in a destination options header or in a hop-by-hop header, in compliance with RFC 2460. In the embodiment, a destination options header and a hop-by-hop header may be contained in the same datagram.

Referring to FIG. 6, the full width corresponds to 32 bits (4 octets). However, other embodiments of the invention may utilize different data field alignments and different data widths for any of the data fields. In the exemplary embodiment, the data fields may be contained in a header that is compatible with RFC 2460.

In the exemplary embodiment, version data field 651 is a 8-bit field that indicates the version of the message header. Datum data field 653 is a 8-bit field that indicates the used map datum (e.g., standard MIL-STD-2401) for determining the geographical position. Latitude data field 603 is a 32-bit field that indicates the latitude value of the source device (e.g., corresponding to an approximate location of node 207) presented in ANSI/IEEE Std 754-1985 format. Longitude data field 605 is a 32-bit field that indicates the longitude value of the source device presented in ANSI/IEEE Std 754-1985 format. Alt indicator data field 639 is a 1-bit field indicating the use of altitude information. Altitude data field is a 16-bit field that indicates the altitude value of the source device presented in ANSI/IEEE Std 754-1985 format.

Velocity indicator data field 609 is a 1-bit field indicating the use of velocity information. If velocity information is included, this field is set to '1'. Otherwise this field is set to '0'. Heading data field 611 is a 16-bit field that indicates the direction where the mobile node is moving. If velocity indicator data field 609 is set to '0', this field is ignored. Otherwise, this field is included and is set to the angle of axis of horizontal velocity uncertainty, in units of 5.625 degrees, in the range from 0 to 84,375 degrees, where 0 degrees is True North and the angle increases toward the East. Vertical velocity data field 613 is an 8-bit field, which indicates the vertical velocity of the mobile node. Vertical velocity data field 613 is used if field 609 is set to '1'. Horizontal velocity data field 615 is a 16-bit field that indicates the horizontal velocity of the mobile node. If velocity indicator is set to '1', this field is in use. Once used, the horizontal speed is set in units of 0.25 m/s, in the range from 0 to 511.75 m/s. Otherwise this field is ignored.

Loc_Unc_H indicator data field 617 is a 1-bit field which indicates the horizontal position uncertainty, including elliptical. If elliptical horizontal position uncertainty information is included in this response element, this field is set to '1'. Otherwise, this field is set to '0'. Loc_Unc angle data field 619 (angle of axis of the standard error ellipse for horizontal position uncertainty) is a 8-bit field indicating the angle of axis of the standard error ellipse for horizontal position uncertainty. If Loc_Unc_H indicator field 617 is set to '0', this field is ignored. Otherwise, this field is included and is set to angle of axis for horizontal position uncertainty, in units of 5.625 degrees, in the range from 0 to 84.375 degrees, where 0 degrees is True North and the angle increases toward the East. Loc_Unc A data field 621 (standard deviation of error along angle specified for horizontal position uncertainty) is a 8-bit field indicating the Standard deviation of error along angle specified for horizontal position uncertainty. If Loc_Unc A data field 621 is set to '0', this field is ignored. Otherwise, this field is included and is set to represent the standard deviation of the horizontal position error along the axis corresponding to Loc_Unc angle data field 619. Loc_Unc P data field 623 (standard deviation of error along angle specified for horizontal position uncertainty) is a 8-bit field indicating standard deviation of error along angle specified for horizontal position uncertainty. If Loc_Unc P data field 623 is set to '0', this field is ignored. Otherwise, this field is included and is set to represent the standard deviation of the horizontal position error perpendicular to the axis corresponding to Loc_Unc angle data field 619. Loc_Unc vertical data field 625 (standard deviation of vertical error for position uncertainty) is a 8-bit field indicating standard deviation of vertical error for position uncertainty.

Vel_Unc angle data field 627 (angle of axis of standard error ellipse for horizontal velocity uncertainty) is a 8-bit field indicating the angle of axis of standard error ellipse for horizontal velocity uncertainty. If Vel_Unc angle data field 627 is set to '0', this field is ignored. Otherwise, this field is set to the angle of axis for horizontal velocity uncertainty, in units of 5.625 degrees, in the range from 0 to 84,375 degrees, where 0 degrees is True North and the angle increases toward the East. Vel_Unc A data field 629 (standard deviation of error along angle specified for horizontal velocity uncertainty is a 8-bit field indicating standard deviation of error along angle specified for horizontal velocity uncertainty. If velocity indicator data field 609 is set to '1', this field is included and is set to represent the standard deviation of the horizontal velocity error along the angle corresponding to Vel_Unc angle data field 627. Vel_Unc P data field data field 631 (standard deviation of error perpendicular to angle specified for horizontal velocity uncertainty) is a 8-bit field indicating standard deviation of error perpendicular to angle specified for horizontal velocity uncertainty. If velocity indicator data field 609 is set to '1', this field is included and is set to represent the standard deviation of the horizontal velocity error perpendicular to the angle corresponding to Vel_Unc angle data field 627. Otherwise, this field is ignored. Vel_Unc vertical data field 633 (standard deviation of vertical velocity error) is an 8-bit field indicating the standard deviation of vertical velocity error.

In the embodiment, location uncertainty data fields 619-625 may be used to define a geographical area, where the data of location uncertainty data fields may not be as specified by Standards, but can be used by an application for conveying region information. In such a case, the application could recognize the use of location uncertainty data fields 619-56 and/or the variation from the specification as indicated in some other field of the header.

Figure 7:
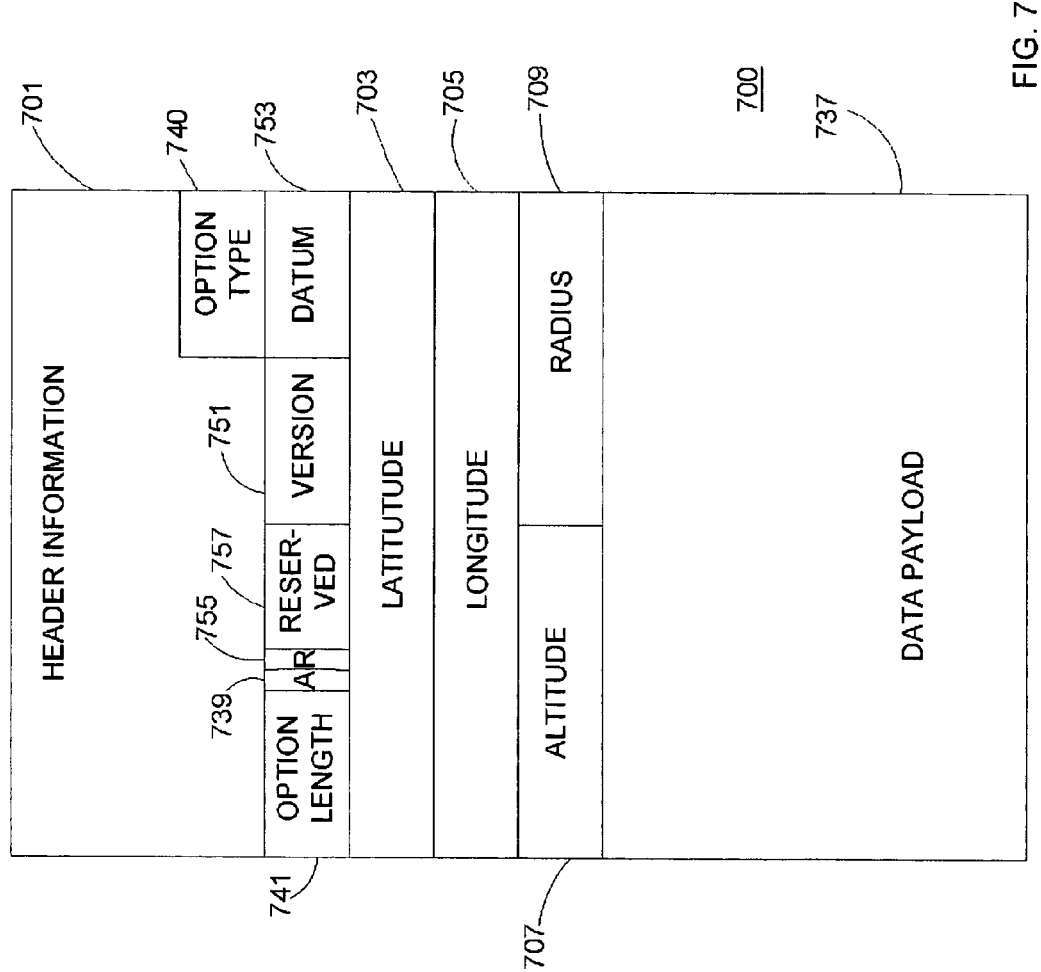
FIG. 7 shows a second exemplary layout of a message that supports a geographical-based service in accordance with an embodiment of the invention.

FIG. 7 shows a second exemplary layout of a message 700 that supports a geographical-based service in accordance with an embodiment of the invention. Datagram 700 comprises header information 701 (such as the source IP address and the destination address) and data payload 737. Also, datagram 700 comprises geographical position information about a destination position corresponding to a option type data field 740, an option length data field 741, a reserved data field 757, a version data field 751, a datum data field 753, a latitude data field 703, a longitude data field 705, an altitude data field 707, and radius fields 709 and 755. In the exemplary embodiment, the geographical information is contained in a destination options header or in a hop-by-hop header, in compliance with RFC 2460.

Referring to FIG. 7, the full width corresponds to 32 bits (4 octets). However, other embodiments of the invention may utilize different data field alignments and different data widths for any of the data fields. In the exemplary embodiment, the data fields may be contained in a header that is compatible with RFC 2460.

In the exemplary embodiment, version data field 751 is an 8-bit field that indicates the version of the message header. Datum data field 753 is a 8-bit field that indicates the used map datum (e.g., standard MIL-STD-2401) for determining the geographical position. Latitude data field 603 is a 32-bit field that indicates the latitude value of the destination position presented in ANSI/IEEE Std 754-1985 format. Longitude data field 705 is a 32-bit field that indicates the longitude value of the destination position presented in ANSI/IEEE Std 754-1985 format. Alt indicator data field 739 is a 1-bit field indicating the use of altitude information. Altitude data field is a 16-bit field that indicates the altitude value of the destination position presented in ANSI/IEEE Std 754-1985 format. Radius data field 709 is a 16-bit field that indicates the horizontal radius in meters from the destination position. Radius indicator data field is a 1-bit field that indicating the use of the radius information that is contained in radius data field 709. If set to '1', radius data field 709 is present.

With the embodiment, a separate message is not required to provide geographical information. An IPv6 datagram, shown in FIGS. 6 and 7, may carry both geographical information as well as a payload that is associated with a geographical-based feature. (Other embodiments may use other messages and other formats that may not be bound to the source or destination.) Combining these functions into the same datagram may facilitate processing the datagrams by a server that supports the geographical-based service. In a variation of the invention, header information in message 700 (corresponding to destination position) may be included in the same message as message 600 (corresponding to source position) in the same datagram. The header information may be supported in an IPv6 destination options header or in an IPv6 hop-by-hop header.

Figure 8:
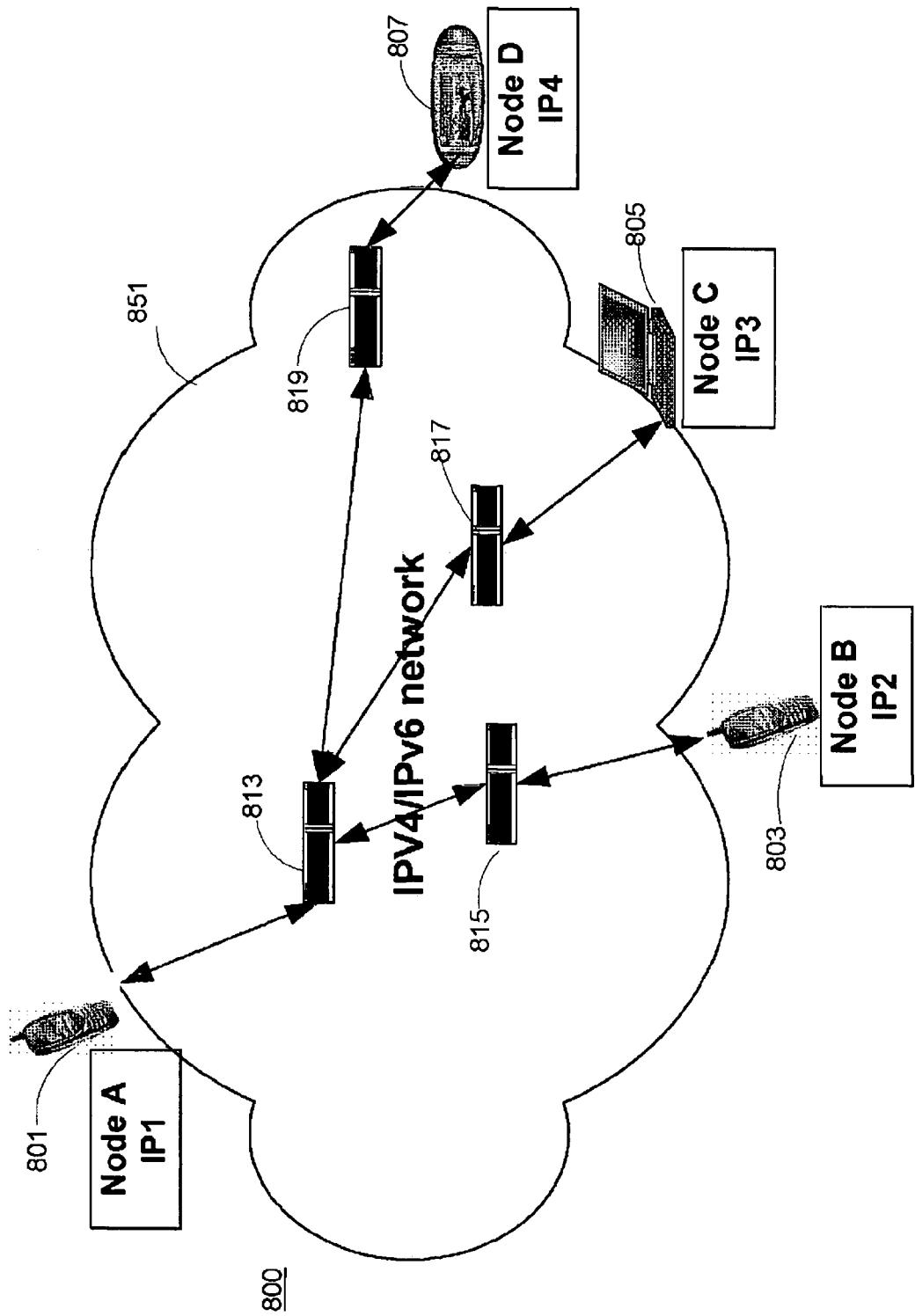
FIG. 8 shows a system model for a Ping application with GPIPv6 support in accordance with an embodiment of the invention.
Figure 11:
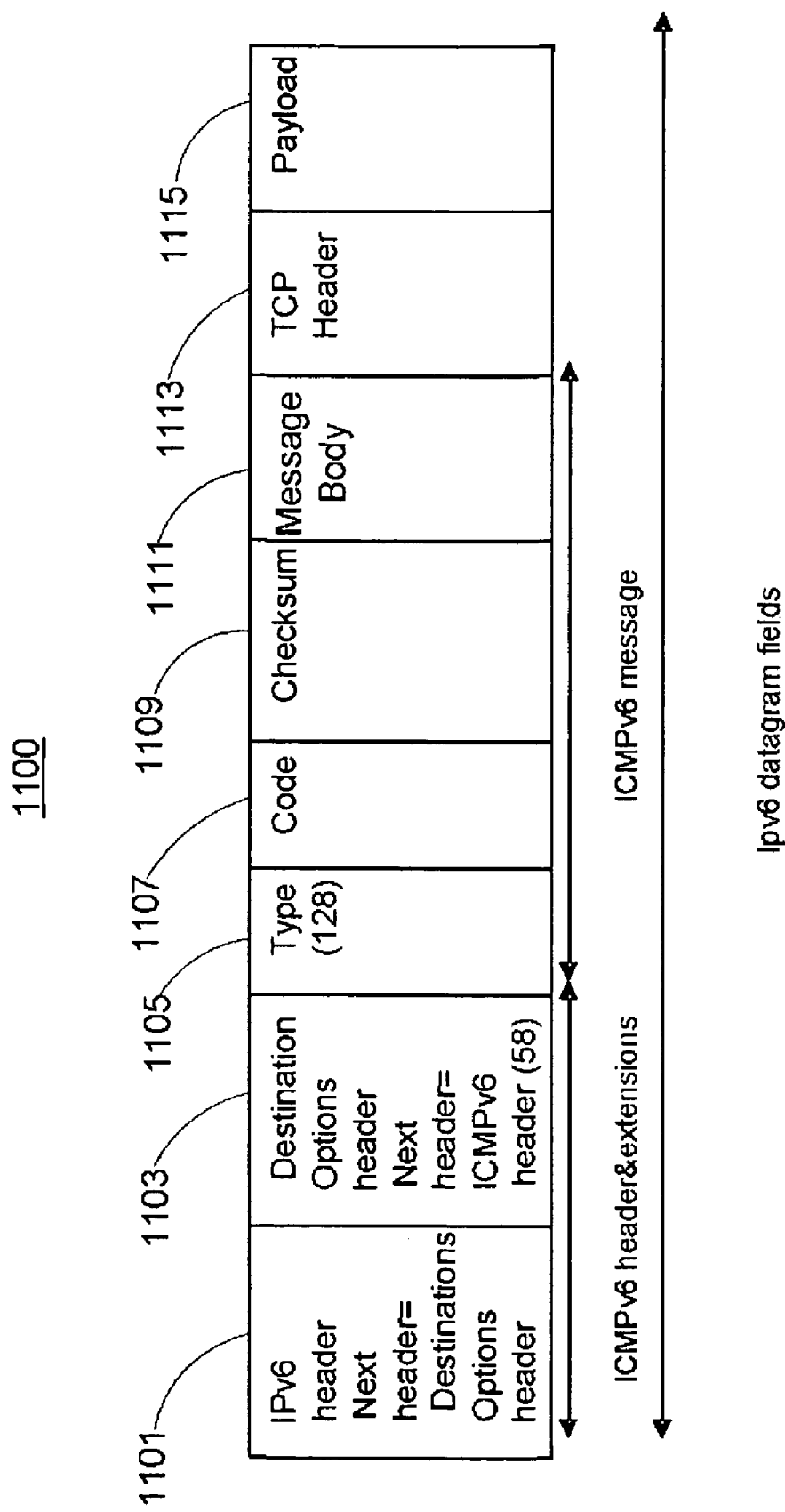
FIG. 11 shows an IPv6 datagram format in accordance with an embodiment of the invention.

FIG. 8 shows a system model 800 for a Ping application with GPIPv6 (Geographical Position Internet Protocol, IP version 6) support in accordance with an embodiment of the invention. The Ping application utilizes GPIPv6 messaging that includes Internet Control Message Protocol (ICMP). In the embodiment, source (requesting) node 801 sends an echo request message in a request IP datagram (in compliance with an Internet Protocol version (IPv6) specification) to target nodes 803, 805, and 807 through routers 813, 815, 817, and 819 in IPv4/IPv6 network 851. The echo request message may be an ICMPv6 informational message. (Another embodiment of the invention may use another type of ICMPv6 informational message as will be discussed.) In the embodiment, target nodes 803, 805, and 807 are GPIPv6-capable terminals. A terminal may have a fixed position or a mobile position. When a target node 803, 805, or 807 receives an echo request message, the target node returns geographical information to source node 801 using a higher layer protocol, e.g., ICMP informational messages. In the embodiment, target node 803, 805, or 807 returns an echo reply message and GPIPv6 extension header (e.g., a destination options header or a hop-by-hop header as previously discussed) in a reply datagram to source node 801. A datagram format is shown in FIG. 11 that will be discussed. The echo reply message may be an ICMPv6 informational message and the extension header contains the geographical position of the corresponding target node. In the embodiment shown in FIG. 8, if target node 803, 805, or 807 is not GPIP-capable, the target node returns an echo reply message without any GPIP information.

As shown in FIG. 8, source node 801 and target nodes 803, 805, and 807 have a peer-to-peer relationship. For example, source node 801 can send a request directly to target node 803 and vice versa. However, the embodiment of the invention can also support a client-server architecture. In a client-server architecture, a server node may manage a geographical-based service on behalf of a client (e.g., source node 801). As an example, a server node may maintain geographical information for a plurality of nodes and report pertinent information to a requesting node that may be predicated on the geographical position of the requesting node.

Figure 9:
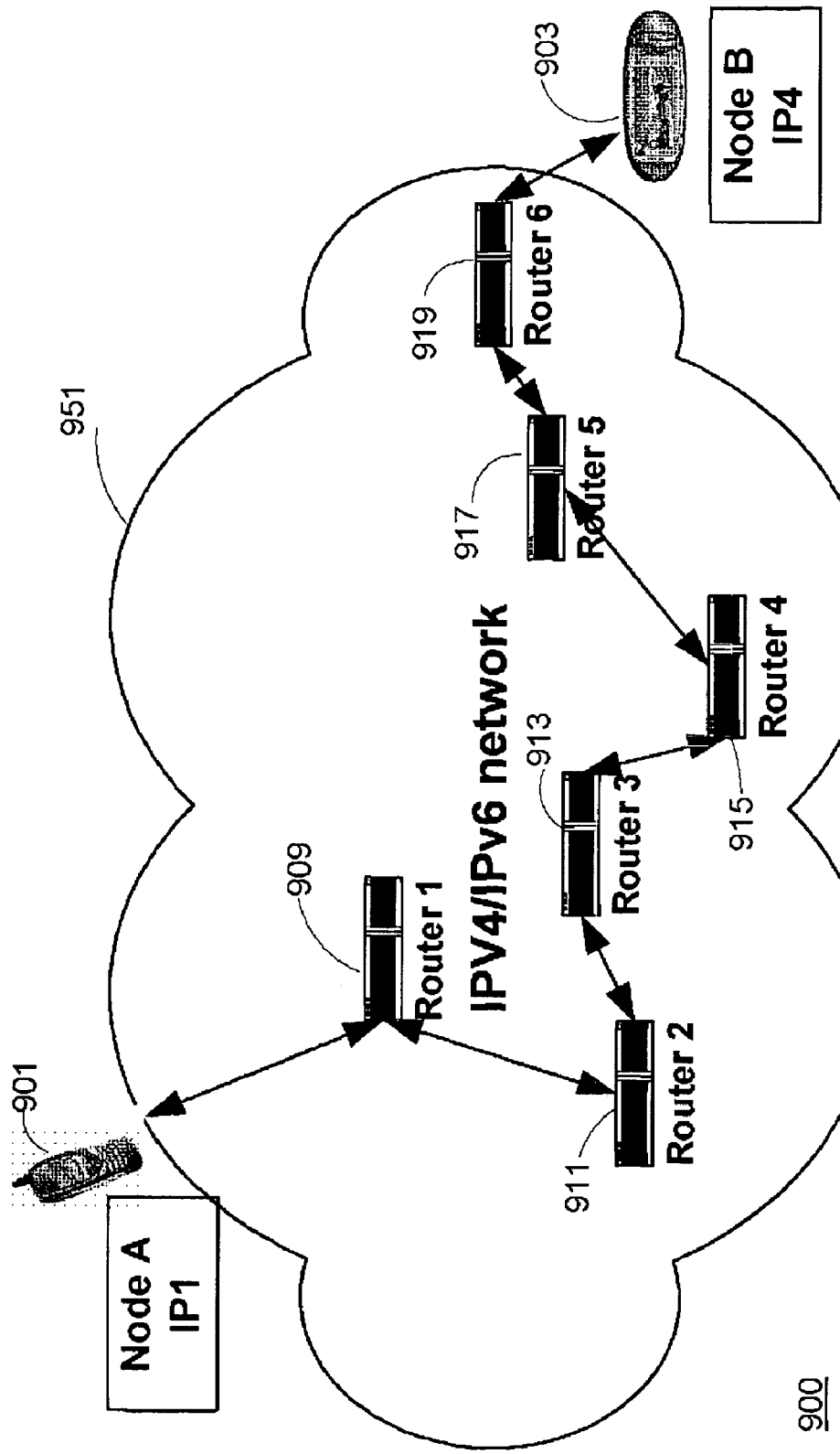
FIG. 9 shows a system model for a Traceroute application with GPIPv6 support in accordance with an embodiment of the invention.

FIG. 9 shows a system model 900 for a Traceroute application with GPIPv6 support in accordance with an embodiment of the invention. The Traceroute application utilizes GPIPv6 messaging that includes Internet Control Message Protocol (ICMP). In the embodiment, source (requesting) node 901 sends an echo request message in a request IP datagram (in compliance with an Internet Protocol version (IPv6) specification) to target node 903 through routers 909, 911, 913, 915, 917, and 919 in a IPv4/IPv6 network 951. The echo request message may be an ICMPv6 informational message. In the embodiment, target node 903 and routers 909, 911, 913, 915, 917, and 919 are GPIPv6-capable. Each router 909, 911, 913, 915, 917, and 919 return an echo reply message to source node 901 as the request IP datagram is routed to target node 903. Each router includes its geographical position in an extension header with an echo reply message in concert with the datagram format as shown in FIG. 11. When target node 903 receives an echo request message, target node 903 returns geographical information to source node 901.

Figure 10:
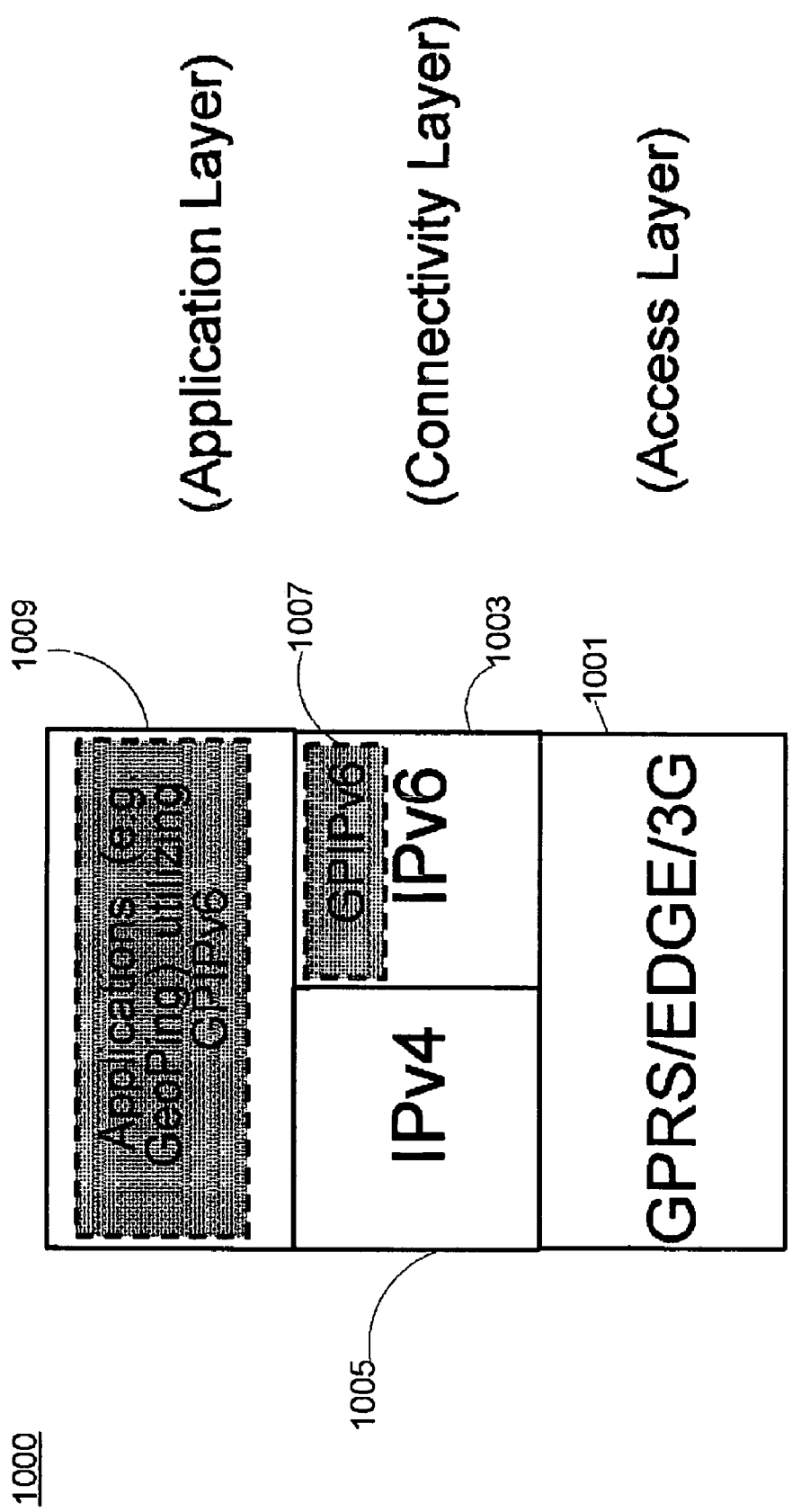
FIG. 10 shows a layered architecture in accordance with an embodiment of the invention.

FIG. 10 shows a layered architecture 1000 in accordance with an embodiment of the invention. Access layer 1001 corresponds to a physical layer and a link layer (layers 1 and 2). Networks 851 and 951 support IPv4 with connectivity layer 1005 and IPv6 with connectivity layer 1003. Networks 851 and 951 may be compatible with both IPv4 and IPv6 protocol specifications. Connectivity layer 1003 supports GPIPv6 protocol 1007 on top of IPv6 protocol. The IPv6 protocol corresponds to the network layer (layer 3). In the disclosure, a protocol at a hierarchical level of GPIPv6 protocol 1007 or higher is considered to be a higher layer protocol. GPIPv6 protocol 1007 includes the specification of ICMPv6 informational messages that support GPIPv6.

FIG. 11 shows an IPv6 datagram format 1100 in accordance with an embodiment of the invention. With the embodiment, a GPIPv6 datagram comprises header 1101, extension header 1103, an ICMPv6 informational message, TCP header 1113, and payload 1115. In the embodiment, the ICMPv6 informational message comprises message type field 1105 (corresponding to a value of 128 for an echo request message and 129 for an echo reply message), a code field 1107 (which will be discussed later), checksum field 1109, and message field 1111. Extension header 1103 corresponds to a destination options header (as previously discussed). Extension header 1103 includes the geographical position of the corresponding target node. (The embodiment also supports other extension header such as a hop-by-hop header as previously discussed.) Also, the embodiments, as shown in FIGS. 8 and 9, enable the source node to include its geographical position by including an extension header with the requesting datagram.

Figure 12:
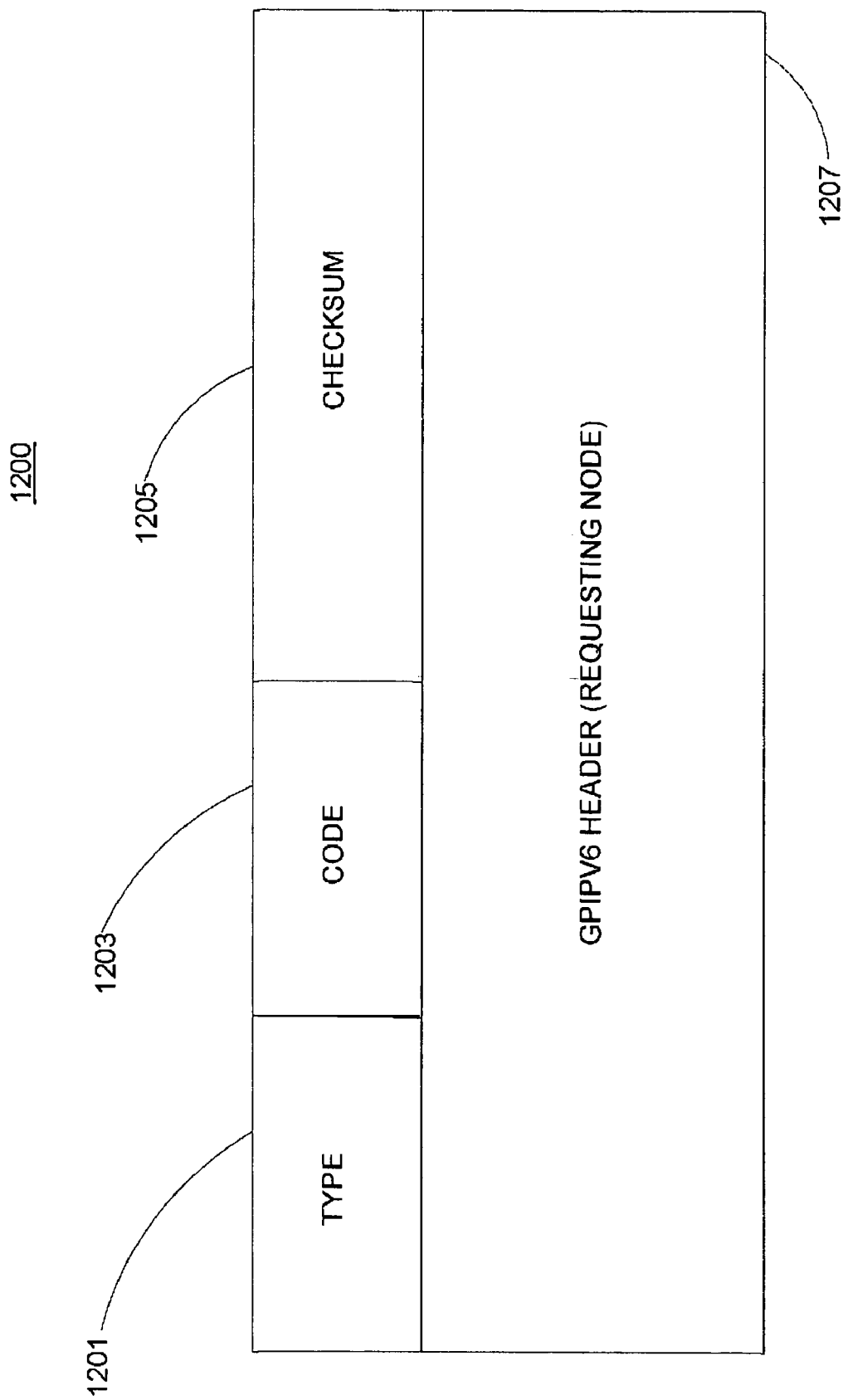
FIG. 12 shows a format for a Position Information Request message in accordance with an embodiment of the invention.

FIG. 12 shows a format for Position Information Request message 1200 in accordance with an embodiment of the invention. In the embodiment, the Position Information Request message 1200 functions as the ICMPv6 informational message. Message 1200 includes a message type 1201 (corresponding to Position Information Request), a code field 1203, a checksum field 1205, and GPIPv6 header 1207 that is optionally included in the Position Information Request message 1200. While format 1100 includes geographical position information in extension header 1103 that is separate from the ICMPv6 informational message, message 1200 includes the geographical position of the requesting (source) node.

In the embodiment, Position Information Request message 1200 optionally includes the geographical position of the requesting node by setting the value of code field 1203 to '1' and inserting extension header 1103. If Position Information Request message 1200 does not contain the geographical position of the requesting node, the value of code field 1203 to '0'.

Although message 1200 optionally includes geographical coordinates of the requesting node, other geographical information, e.g., the street address of the requesting node, may be included in the message body of the Position Information Request message.

Figure 13:
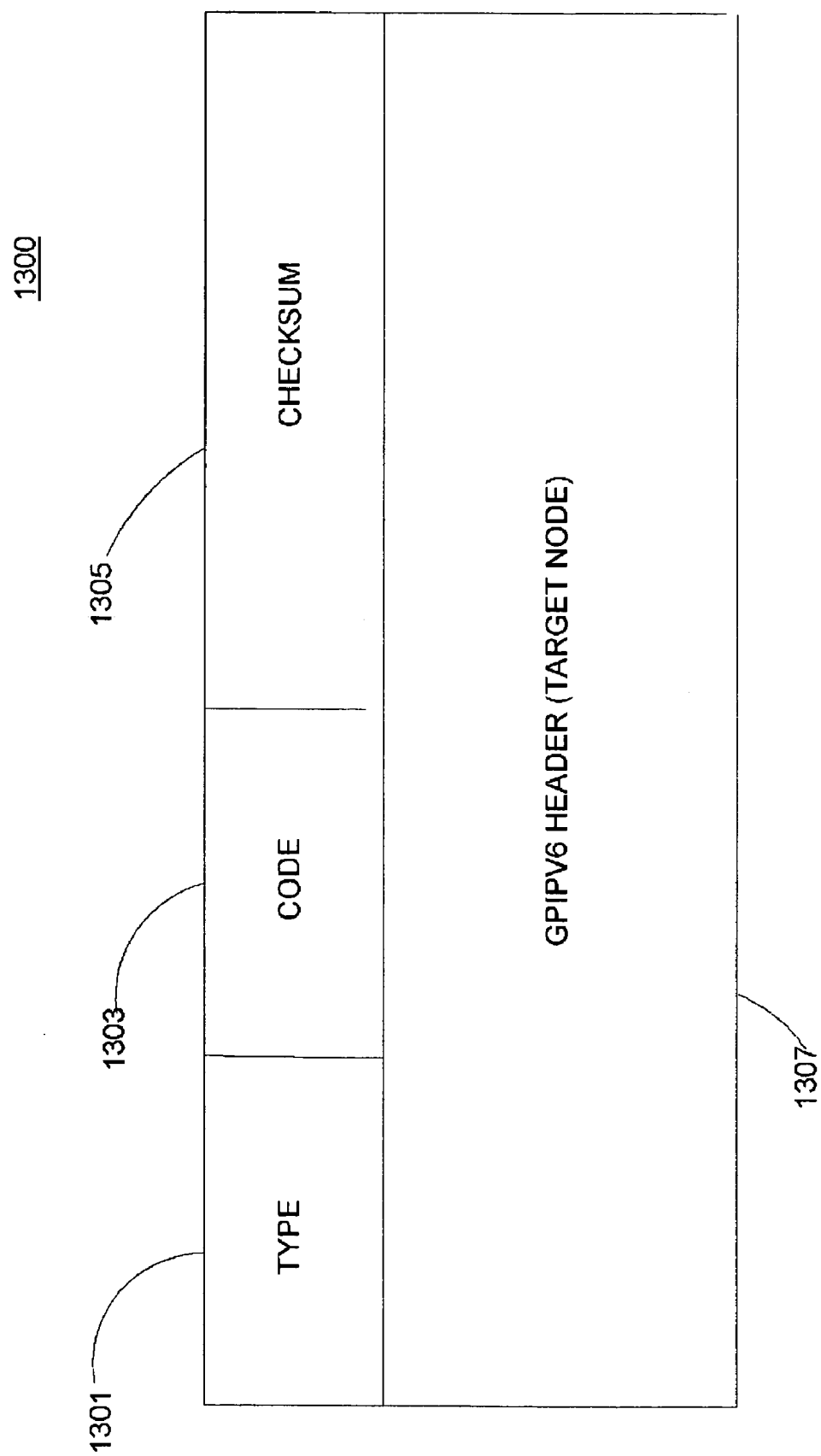
FIG. 13 shows a format for a Position Information Reply message in accordance with an embodiment of the invention.

FIG. 13 shows a format for Position Information message 1300 in accordance with an embodiment of the invention. Message 1300 includes message type 1301, code field 1303, checksum field 1305, and GPIPv6 header 1307. GPIPv6 header includes geographical coordinates of the responding (target) node. As with Position Information Request message 1300, the street address of the responding node may be included. Moreover, associated non-geographical information may be included in the Position Information message 1200. Examples of non-geographical information will be discussed with FIG. 16. If the target node is not GPIPv6 capable and does not consequently support Position Information Request and Position Information messages 1200 and 1300, the target node may return an error message (e.g., parameter problem) in accordance with RFC 792. In the embodiment, code field 1303 equals '0' corresponds to a reply to a Position Information Request message. If code field 1303 equals '1', then the Position Information message contains the geographical position of the source node and is not a reply to a Position Information Request message.

In another embodiment of the invention, three ICMPv6 informational messages are supported. As with the previous embodiment, the embodiment supports the Position Information Request message. Moreover, the embodiment supports the Position Information Reply message, which provides the reply to the Position Information Request message, and the Position Information Indication message, which provides the geographical position of the source node to a target node.

GPIPv6 data may be protected, if needed, by using IPv6 security features such as defined in RFC 2406 (The Internet Engineering Task Force, "IP Encapsulating Security Payload (ESP)"). The security of IPv6 is described in RFC 2401 (The Internet Engineering Task Force, "Security Architecture for the Internet Protocol"). Alternatively, GPIPv4 data can be used without protection if the network provides adequate protection. Moreover, authentication can be provided by using a separate Authentication header as defined in RFC 2460. For encrypted GPIPv6 data, authentication can be similarly provided as unencrypted GPIPv6 data or by using the authentication mechanism available within the IP Encapsulating Security Payload (ESP) header.

Figure 14:
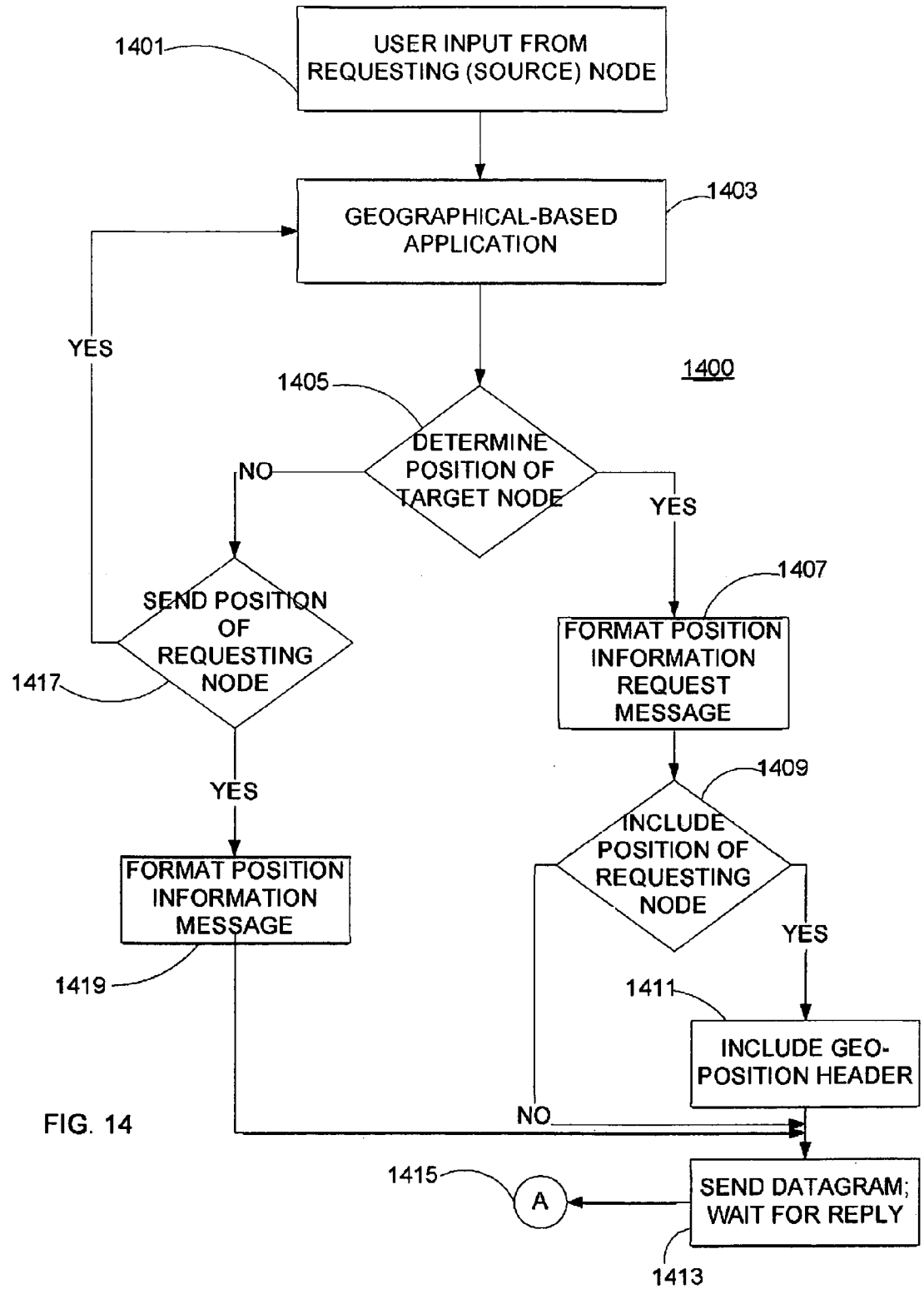
FIG. 14 shows a flow diagram for a geographical-based application in accordance with an embodiment of the invention.

FIG. 14 shows a flow diagram 1400 for a geographical-based application in accordance with an embodiment of the invention. The process shown in FIGS. 14 and 15 uses the ICMPv6 informational messages as previously discussed. However, other embodiments of the invention may use other ICMPv6 informational message or may use messaging supported by another higher layer protocol. In step 1401, a user of a requesting node (e.g., source node 801 as shown in FIG. 8) initiates a request for a geographical-based service. In step 1403, the associated geographical-based application processes the request. If the user request entails determining the position of a target node, as determined in step 1405, a Position Information Request message with the address of the associated target node is formatted in step 1407. The address may identify a single target node or may identify a plurality of target nodes using a multicast address. Step 1409 determines if the geographical position of the requesting node should be included in the Position Information Request message. If so, in step 1411 a geographical position header is included in the Position Information Request message. In the embodiment, the format of the geographical position header has a format as shown in FIG. 6 or FIG. 7. An IPv6 datagram is sent to the target node in step 1413.

In process 1400, if step 1417 determines that the source node is reporting its geographical position to a target node but is not requesting a reply from the target node, then the geographical position is included in a Position Information message in step 1419. An IPv6 datagram is sent to the target node in step 1413.

Figure 15:
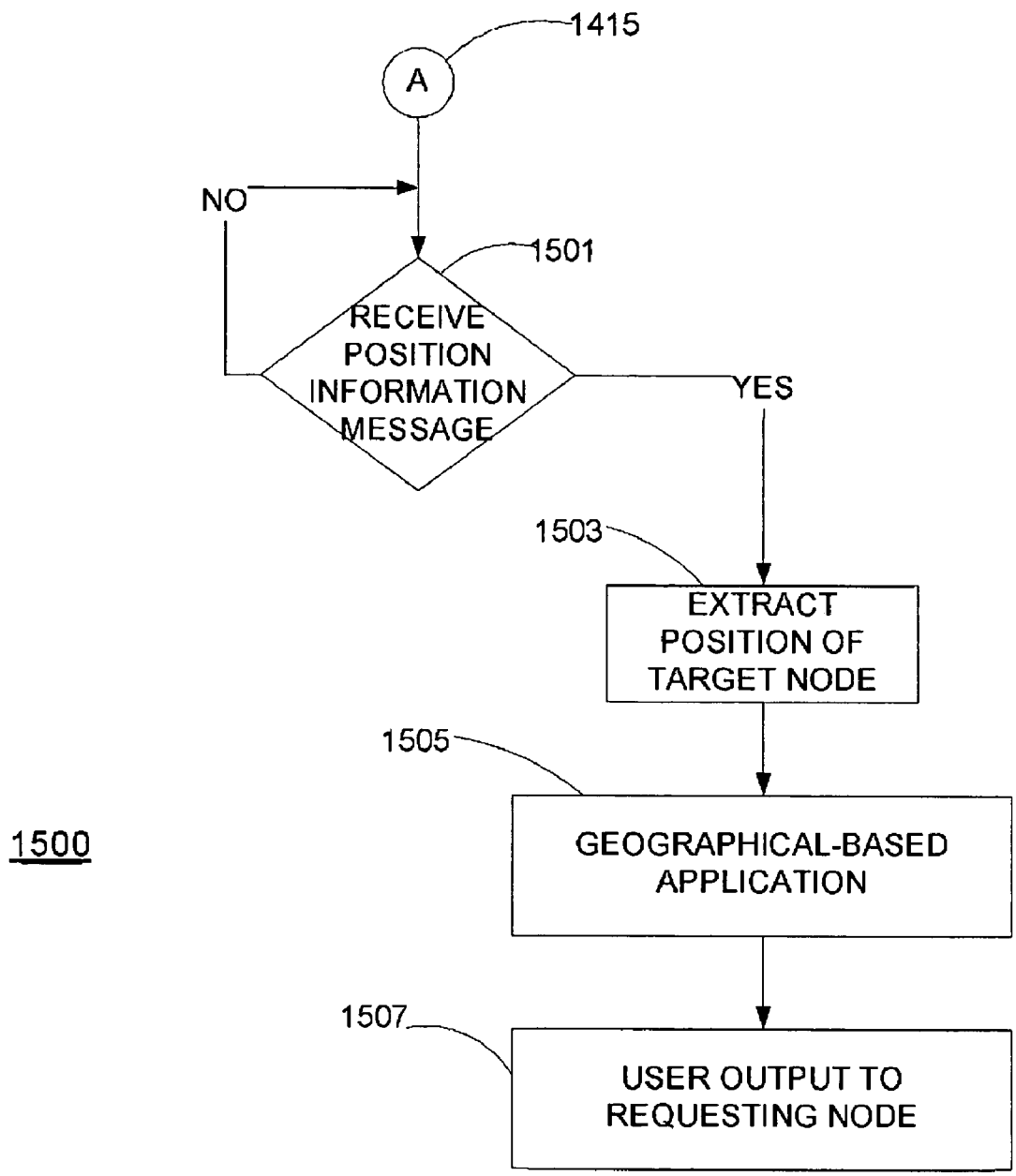
FIG. 15 shows a continuation of the flow diagram shown in FIG. 14.

FIG. 15 shows a continuation of flow diagram 1400 shown in FIG. 14. (Step 1415 corresponds to step 1415 in FIG. 14.) If the source node is expecting a reply from the target node in response to sending a Position Information Request message to the target node, step 1501 determines if a Position Information message is received. If so, the geographical position of the target node is extracted from the received message in step 1503. If not, the source node waits for the expected reply. The received geographical position of the target node is provided to the geographical-based application in step 1505. In step 1507, the user is provided an output that conveys the geographical position.

In an embodiment, before a target node returns its geographical position in response to a Position Information Request message, the target node accesses a GPIPv6 policy database (GPD) to determine if the requesting node has sufficient rights to obtain the location parameters and if the latest location information delivered to the requesting node has expired. If so, the target node inserts a GPIPv6 header within the reply message (e.g., Position-Information message 1300 with code field 1303 equal to '0'). If the target node accepts the request from the requesting node, code field 1303 is set to an appropriate value.

Figure 16:
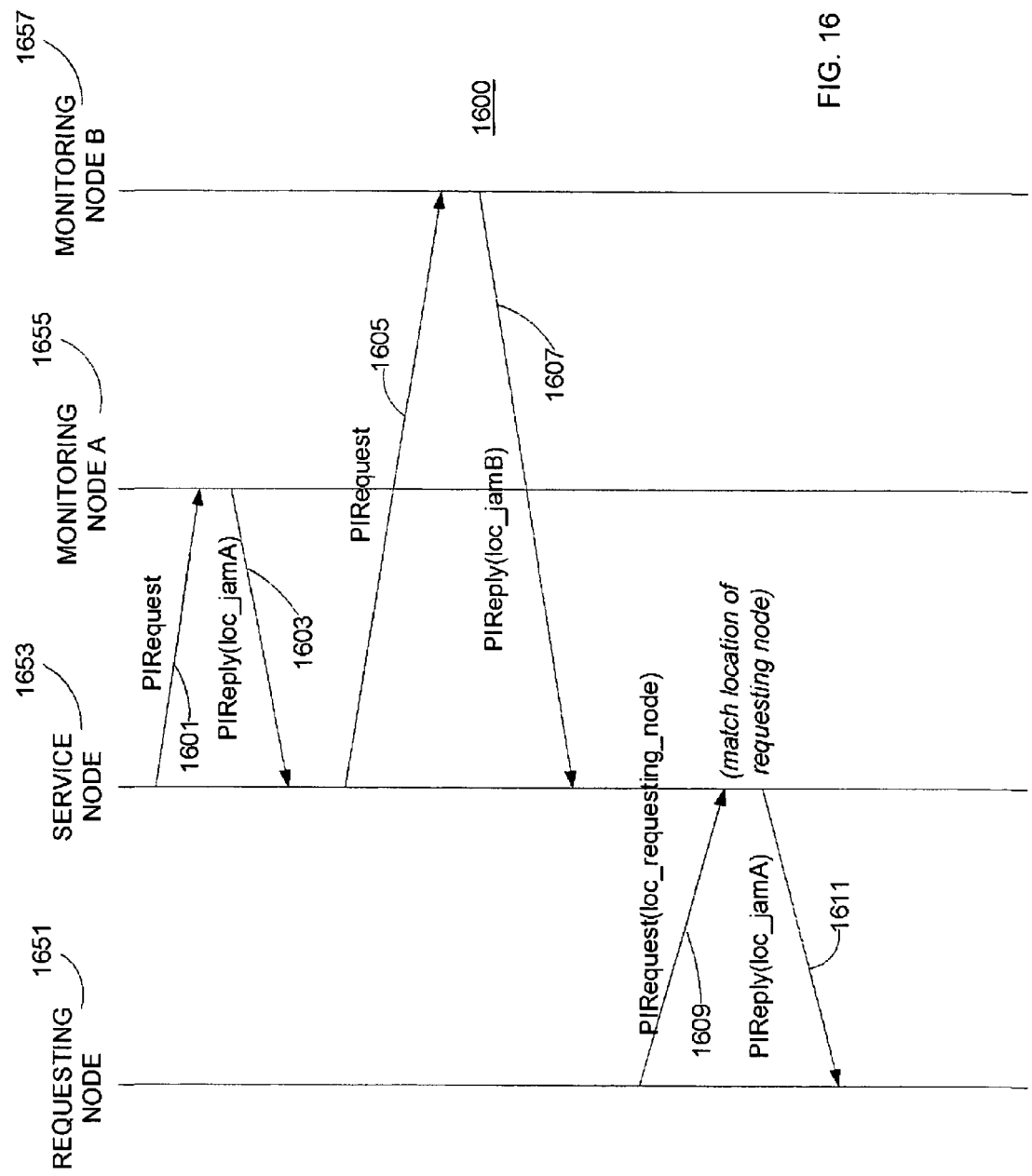
FIG. 16 shows a message scenario for supporting a geographical-based application in accordance with an embodiment of the invention.

FIG. 16 shows a message scenario 1600 for supporting a geographical-based application in accordance with an embodiment of the invention. Message scenario 1600 can be associated with different applications, in which requesting node 1651 and service node 1653 have a client-server relationship. Service node 1653 obtains geographical-based information from monitoring nodes 1655 and 1657. For example, service node 1653 can provide an automotive traffic advisory service by collecting traffic congestion information from monitoring nodes 1655 and 1657. In message scenario 1600, service node 1653 queries nodes 1655 and node 1657 by sending Position Information Request messages 1601 and 1605, respectively. Nodes 1655 and 1657 report traffic locations that are experiencing traffic congestion by returning Position Information messages 1603 and 1607, respectively. Each monitoring includes the geographical position where traffic congestion is occurring.

Requesting node 1651 requests for a traffic report by sending Position Information Request message 1609, which includes the geographical position of requesting node 1651 to service node 1653. Service node 1653 obtains the geographical position of requesting node 1651 and matches the position with geographical information that is received from monitoring nodes 1655 and 1657. Serving node 1653 returns the relevant geographical information to requesting node 1651 by returning Position Information message 1611.

While scenario 1600 shows a reply message (e.g., message 1601) being sent in response to a request message (e.g., message 1603), with another embodiment of the invention, a node can send geographical information without receiving a request. For example, node 1655 may periodically send geographical information or and automatically send geographical information if a certain event (e.g., a traffic jam at an associated street intersection) occurs.

A node may return geographical information that comprises geographical coordinates or that is represented by some other format such as a street address. Also, non-geographical information, in addition or in lieu of geographical information, can be returned by a node. As an example, scenario 1600 may represent a gasoline-pricing service, in which the price of gasoline and the location of the associated gasoline station are returned.

Embodiments of the invention support numerous geographical-based services with either peer-to-peer or with client-server architectures. For example, a user associated with a source node can locate another user associated with a target node (e.g., a wife looking for her husband in a busy shopping mall), in which the associated nodes have a peer-to-peer relationship. Moreover, the target node need not be associated with another user (e.g., a user looking for a key chain) if the target node (e.g., a key chain) has integrated circuitry to support the geographical-based service. With a client-server architecture, embodiments support numerous applications including automotive traffic reports, vehicle fleet tracking, and emergency services.

Figure 17:
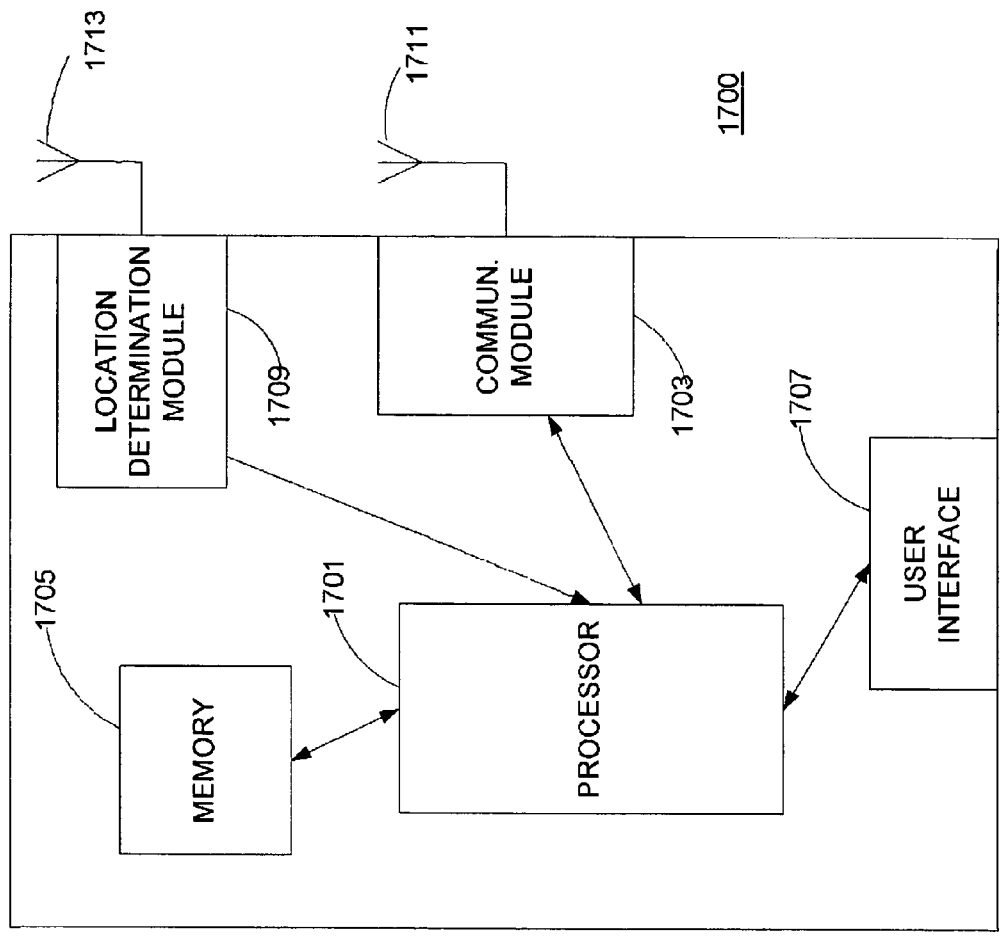
FIG. 17 shows an architecture for a node that supports a geographical-based service in accordance with an embodiment of the invention.

FIG. 17 shows an architecture for a node 1700 (e.g., a source node or a target node) that supports a geographical-based service in accordance with an embodiment of the invention. Node 1700 comprises a processor 1701, a communications module 1703, a memory 1705, a user interface 1707, and a location determination module 1709. Processor 1701 executes computer instructions that are retrieved from memory 1705. Also, processor 1701 retrieves and saves data from/to memory 1705.

Node 1700 (that may correspond to node 207 as shown in FIG. 2) communicates with access point 213 (as shown in FIG. 2) through communications module 1703. In the exemplary embodiment, communications module supports a wireless communications channel and transmits through an antenna 1711. However, other embodiments of the invention may support other communications channels such as a dial-up telephone connection that do not necessitate antenna 1711.

In the embodiment, node 1700 obtains geographical position information through location determination module

1709. Location determination module comprises a Global Position Satellite (GPS) receiver in order to derive position information. Location determination module 1709 receives radio signals through antenna 1713 from a plurality of GPS satellites. From the gathered information, location determination module 1709 derives an approximate position of node 700.

Other embodiments of the invention may utilize other methods for determining a geographical position of node 1700, including assisted GPS, cell identification (corresponding to the location of the cell that node is located), and time difference of arrival (TDOA). In some embodiments, antenna 1713 may not be implemented because antenna may not be required to determine the geographical position of node 1700.

A user may provide commands and data to node 1700 through user interface 1707. For example, the user may input an approximate set of position coordinates (e.g., latitude and longitude) rather than having location determination module 1709 deriving the geographical position of node 1700. Also, if node 1700 receives a datagram from another node, in which the datagram contains another geographical position of the other node, the other geographical position may be displayed on user interface 1707.

Figure 18:
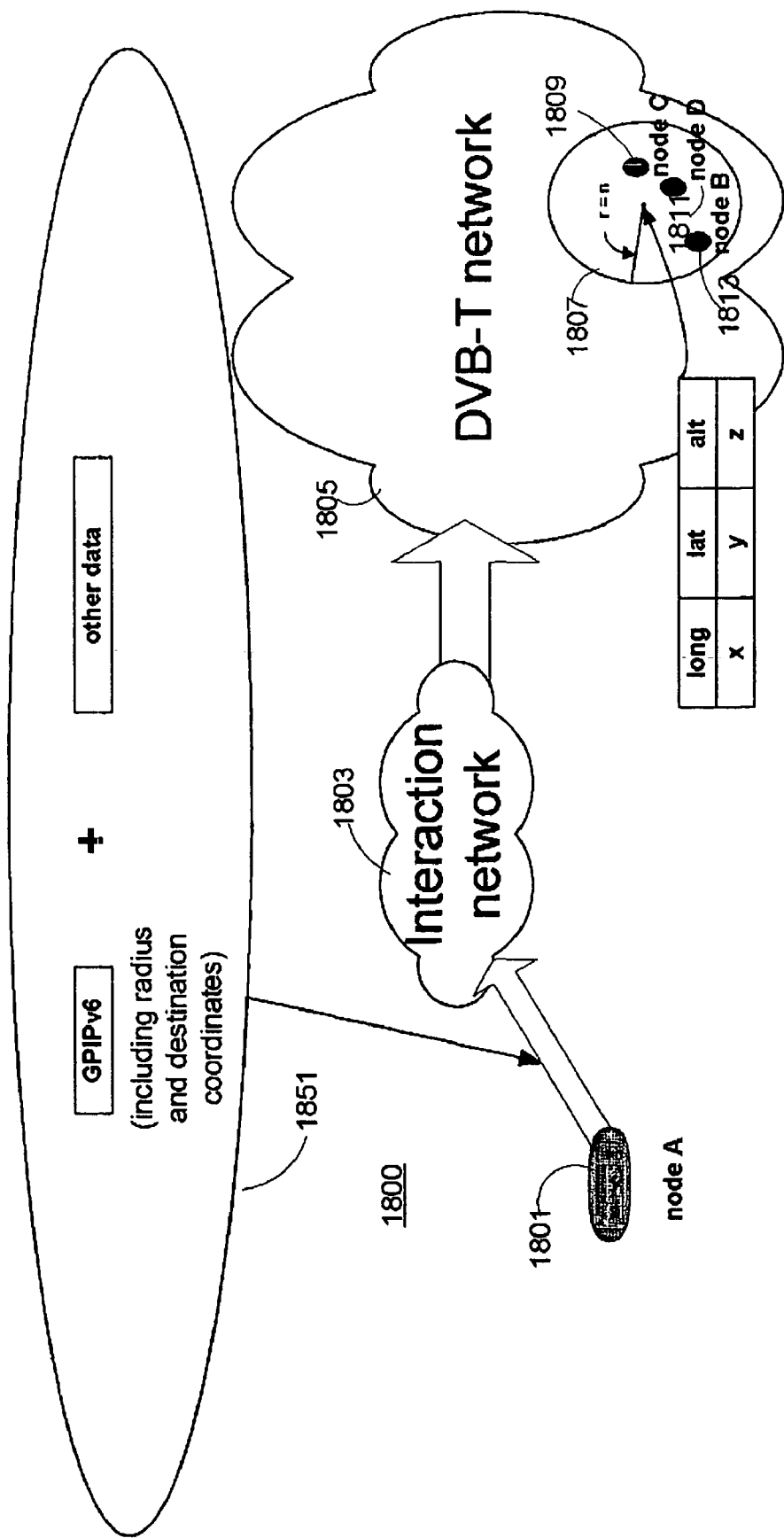
FIG. 18 shows an architecture of a network that supports a geographical-based service in conjunction with a DVB-T network in accordance with an embodiment of the invention.

FIG. 18 shows a network architecture 1800 that supports a geographical-based service in conjunction with a Digital Video Broadcasting-Terrestrial (DVB-T) network 1805 in accordance with an embodiment of the invention. (With other embodiments of the invention, network 1805 may support other digital video broadcasting standards, e.g., ATSC, ISDB, and DVB-H.) A node 1801 is connected to an interaction network 1803 (which may be supported by network 209 as shown in FIG. 2) through a wireless communications channel. To illustrate services that can be supported by network 1800, a user (e.g., a restaurant) of node 1801 wishes to send a video message to other nodes in the vicinity the restaurant in order to broadcast a special meal of the day. The broadcasting of the advertisement is supported by DVB-T network 1805. DVB-T network 1805 typically has unidirectional transmission capabilities to nodes and typically is capable of supporting multicast services with massive data bandwidth for the downlink communications channel. DVB-T network 1805 may not have an appreciable capacity of directly receiving messages from nodes (corresponding to the uplink communications channel).

In the architecture shown in FIG. 18, node 1801 requests for the advertisement to be broadcast by DVB-T network 1805 through interaction network 1803. Node 1801 initiates the request by sending datagram 1851, which includes a GPIPv6 header and other data, to interaction network 1803. In the embodiment, interaction network 1803 supports an interaction network protocol in order to interact with DVB-T network 1805. Node 1801 specifies a region 1807 over which the advertisement is to be broadcast. In the example shown in FIG. 18, nodes 1809-1813 are within region 1807 and thus nodes 1809-1813 receive the advertisement when the advertisement is broadcast. Region 1807, which is an approximate circle, is determined by a specified radius and a destination position that correspond to the approximate radius and center, respectively. (The destination position may correspond to the geographical position of node 1801 or may be a set of coordinates that is different from the geographical position of node 1801.) In order to specify the destination coordinates and the radius, node 1801 may send an IPv6 datagram that includes header information and a data payload (corresponding to the advertisement) as shown in FIG. 7.

Figure 19:
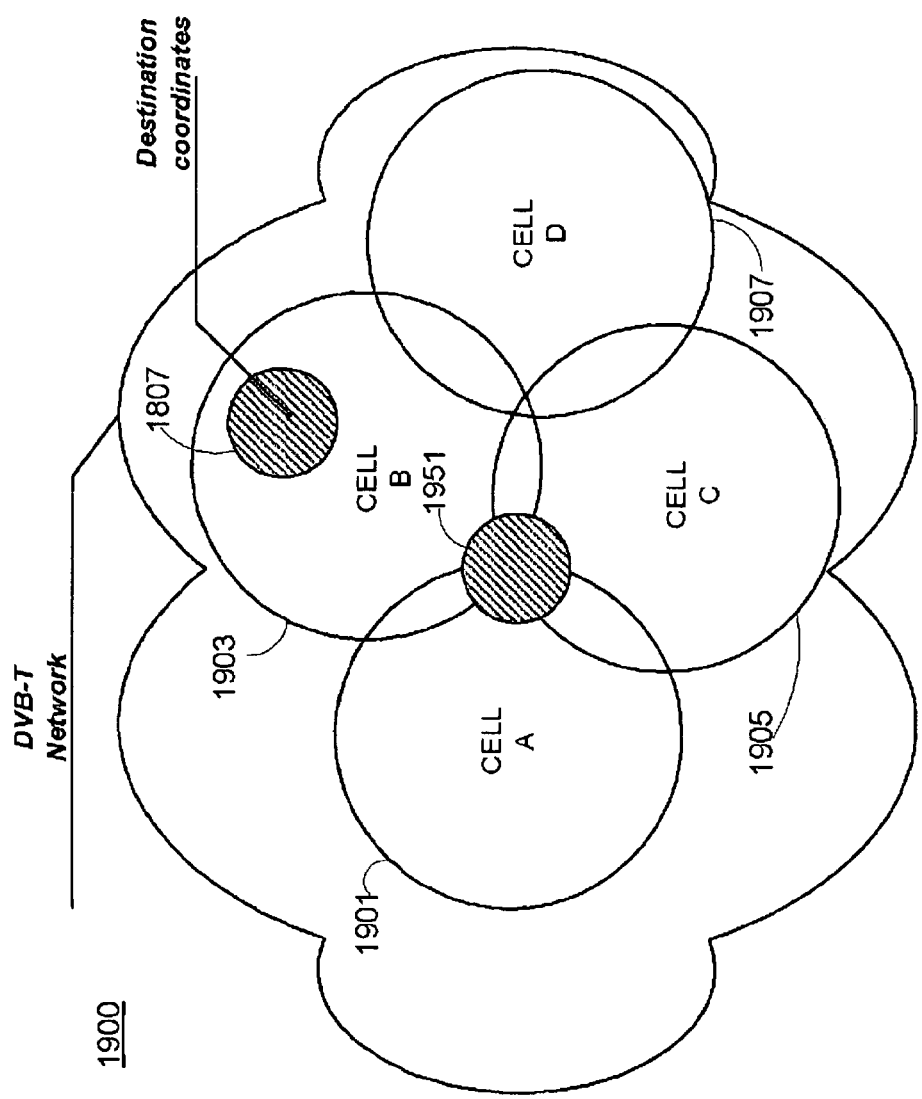
FIG. 19 shows a portion of a service area that is supported by the DVB-T network that is shown in FIG. 18.

FIG. 19 shows a portion of a service area 1900 that is supported by the DVB-T network 1805 that is shown in FIG. 18. Service area 1900 is supported by cells 1901-1907. Region 1807, as specified by node 1801, is contained entirely with cell 1903. Thus, DVB-T network 1805 broadcasts an advertisement from node 1801 over cell 1903. Also, the embodiment supports a scenario in which a requested region spans a plurality of cells. For example a requested region 1951 spans cells 1901-1905. If node 1801 were to specify region 1951 rather than region 1807, the advertisement would be broadcast over cells 1901-1905.

Figure 20:
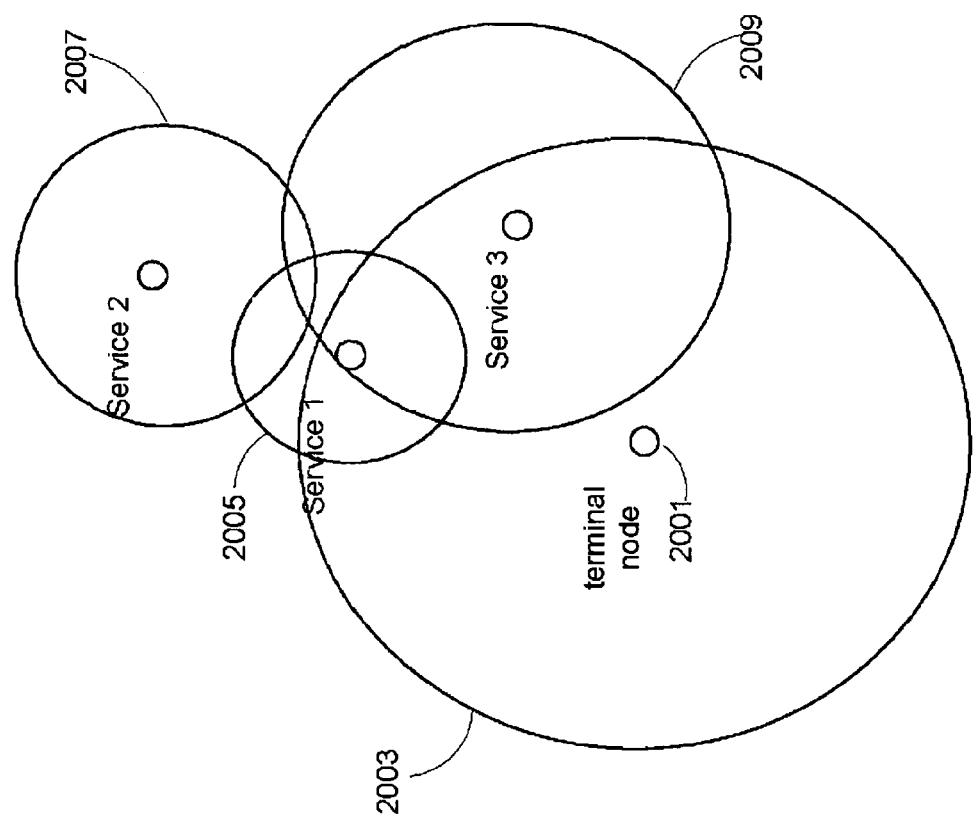
FIG. 20 shows serving regions for a node corresponding to different geographical-based services and a range set by the node within the communications system that is shown in FIG. 2.

FIG. 20 shows serving regions for different geographical-based services that communications system 200 (as shown in FIG. 2) can support a node 2001 for the range set by node 2001. In the example shown in FIG. 20, system 200 is configured to support different services in different regions. A service 1 is supported in region 2005; a service 2 is supported in region 2007; and a service 3 is supported in region 2009. System 200 may notify node 2001 about the service configuration by sending an announcement that provides a service guide, e.g., an Electronic Service Guide (ESG). (The ESG is discussed in more detail with FIG. 21.) Node 2001 is configured to receive broadcasts over an approximate circular region 2003, in which the center corresponds to the position of node 2001 and the radius is specified by the user of node 2001 through a user interface (e.g., user interface 1707 as shown in FIG. 17). In the exemplary embodiment, as shown in FIG. 20, node 2001 is able to receiver services 1 and 3.

FIG. 21 represents a service configuration 2100 that is associated with a service guide (e.g., Electronic Service Guide (ESG)) of communications system 200 for supporting geographical-based services in accordance with an embodiment of the invention. Service configuration 2100 corresponds to the service configuration that is shown in FIG. 20. Each geographical-based service is supported over an approximate circular region that is specified by center coordinates 2103 and radius 2105. Service 2107 (service 1) has center coordinates 2113 and radius 2115. Service 2109 (service 2) has center coordinates 2117 and radius 2119. Service 2111 (service 3) has center coordinates 2121 and radius 2123. Node 2001 is located at center coordinates 2127 and specifies radius 2129 for services. With the corresponding geometry, node 2001 determines what services are available at its current location. Of course, if node 2001 changes locations, a different set of services may be available and thus are recalculated.

FIG. 22 shows a flow diagram 2200 for the node 2001 for determining available services in accordance with an embodiment of the invention. If a service is available and if the user wishes to utilize the service, the service is configured in a filter. The filter processes datagrams that are associated with the selected services. In step 2201, node 2001 determines its position coordinates, e.g. utilizing location determination module 1709 (as shown in FIG. 17). In step 2203, node 2001 sets criteria for determining available services by utilizing center coordinates 2127 and radius 2129. In step 2205, using the service configuration broadcast by system 2000 in an announcement, node 2101 selects services that match coordinate and radius criteria. In the example shown in FIG. 20, node 2001 correspondingly selects service 2107 (service 1) and service 2111 (service 3).

In step 2207, node 2001 configures a message filter, in which datagrams corresponding to service 2107 and service 2111 are processed.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method of determining if a geographically-based service is available to a source node, comprising:
    (A) formatting a requesting service message that is associated with a higher-layer protocol at a source node, the requesting service message including an indicator of a message type, the indicator indicating that a first geographical position of a target node and a radius associated with a maximum distance from the first geographical position is being requested;
    (B) merging the requesting service message in a header of a requesting datagram;
    (C) sending the requesting datagram to the target node;
    (D) in response to (C), receiving a reply datagram from the target node; and extracting a reply position message component from the received reply datagram, the reply position message component including a reply service message that is associated with the higher-layer protocol, the reply position message component extracted from a header of the reply datagram;
    (E) determining the first geographical position of the target node and the radius from the extracted reply position message component; and
    (F) determining whether a service area of a geographically-based service is within the extracted radius defined relative to the extracted first geographical position.

2. The method of claim 1, wherein (F) further comprises:
    determining whether the source node is within the service area of the geographically-based service based on the extracted radius and the extracted first geographical position and a geographical position of the source node.

3. The method of claim 1, further comprising:
    receiving a datagram from a second node;
    extracting a received service message that is associated with the higher-layer protocol, the received service message indicating that the second node is requesting a geographical position of the source node;
    determining the geographical position of the source node;
    formatting a response position message component, the response position message component including the determined geographical position of the source node;
    merging the response position message component in a header of a response datagram; and
    sending the response datagram to the second node.

4. The method of claim 1, wherein (A) comprises:
    formatting an echo request message.

5. The method of claim 1, wherein (A) comprises:
    formatting a position information request message.

6. The method of claim 1, wherein the requesting service message component comprises an extension header and an echo reply message.

7. The method of claim 6, wherein the extension header is selected from the group consisting of a destination option header and a hop-by-hop header.

8. The method of claim 1, further comprising:
    sending the requesting datagram to a different node, wherein a multicast address identifies both the different node and the target node;
    receiving a second datagram from the different node, the second datagram including a second geographical position of the different node and a second radius associated with a maximum distance from the second geographical position; and
    determining whether a second service area of a second geographically-based service is within the second radius defined relative to the second geographical position.

9. The method of claim 1, wherein the first geographical position of the target node comprises geographical coordinates of the target node.

10. The method of claim 1, wherein the first geographical position of the target node comprises a physical location address of the target node.

11. The method of claim 1, further comprising:
    decrypting the reply position message component.

12. The method of claim 1, further comprising:
    authenticating the source-node with the target node.

13. The method of claim 1, further comprising:
    representing the first geographical position on a geographical map.

14. The method of claim 1, wherein the requesting datagram complies with an Internet Protocol version 6 (IPv6) specification, and wherein the requesting service message comprises an Internet control message protocol version 6 (ICMPv6) informational message.

15. The method of claim 1, wherein the reply datagram complies with an Internet Protocol version (IPv6) specification, and wherein the reply service message comprises an Internet control message protocol version 6 (ICMPv6) informational message.

16. The method of claim 15, wherein the first geographical location is contained in an extension header of the reply datagram.

17. The method of claim 16, wherein the extension header is contained in the ICMPv6 informational message.

18. The method of claim 16, wherein the extension header comprises a destination option header.

19. The method of claim 16, wherein the extension header comprises a hop-by-hop header.

20. The method of claim 1, wherein the reply position message component comprises non-geographical information that pertains to the target node.

21. The method of claim 1, wherein (F) comprises:
    determining a street address of the target node from the first geographical position.

22. The method of claim 1, further comprising:
    receiving a service request to initiate the geographically-based service.

23. A computer-readable medium having computer-executable instructions that when executed perform the method comprising:
    (A) formatting a requesting service message that is associated with a higher-layer protocol, the requesting service message including an indicator of a message type, the indicator indicating that a first geographical position of a target node and a radius associated with a maximum distance from the first geographical position is being requested;

(B) merging the requesting service message in a header of a requesting datagram;

(C) sending the requesting datagram to the target node;

(D) in response to (C), receiving a reply datagram from the target node; and extracting a reply position message component from the received reply datagram, the reply position message component including a reply service message that is associated with the higher-reply protocol, the reply position message component extracted from a header of the reply datagram;

(E) determining the first geographical position of the target node and the radius from the extracted reply position message component; and (F) determining whether a service area of a geographically-based service is within the extracted radius defined relative to the extracted first geographical position.

24. The method of claim 1, wherein the source node comprises a wireless terminal.

25. A method that supports a geographical-based service, comprising:

(A) receiving at a target node, a datagram from a requesting node (B) extracting a requesting service message that is associated with a higher-layer protocol from a header of the received datagram, the requesting service message including an indicator of a message type, the indicator indicating that the requesting node is requesting a geographical position of the target node and a radius associated with a maximum distance from the geographical position of the target node;

(C) determining the geographical position of the target node;

(D) formatting a response position message component that is associated with a higher-layer protocol, the response position message component containing the determined geographical position of the target node and the radius;

(E) merging the response position message component in a header of a response datagram; and (F) sending the response datagram to the requesting node to determine whether a service area of a geographically-based service is within the radius defined relative to the determined geographical position.

26. The method of claim 25, further comprising:

(G) determining if the requesting node has permission to obtain the geographical position of the target node and the radius; and (H) in response to (G), including the geographical position and the radius in the response datagram.

27. The method of claim 25, wherein (C) comprises:
acquiring the geographical position by the target node with a Global Position Satellite (GPS) location determination module.

28. The method of claim 25, wherein (C) comprises:
obtaining the geographical position from a serving network.

29. The method of claim 25, wherein (C) comprises:
obtaining the geographical position through a user interface.

30. The method of claim 25, wherein (C) comprises:
acquiring the geographical position by utilizing a time difference of arrival (TDOA) technique.

31. The method of claim 25, wherein the received datagram complies with an Internet Protocol version 6 (IPv6) specification, and wherein the response position message component and the received service message comprise an Internet control message protocol version 6 (ICMPv6) informational message.

32. The method of claim 31, wherein the geographical position is contained in the ICMPv6 informational message.

33. A computer-readable medium having stored computer-executable instructions that when executed perform the method comprising:

(A) receiving at a target node, a datagram from a requesting node;

(B) extracting a requesting service message that is associated with a higher-layer protocol from a header of the received datagram, the requesting service message including an indicator of a message type, the indicator indicating that the requesting node is requesting a geographical position of the target node and a radius associated with a maximum distance from the geographical position of the target node;

(C) determining the geographical position of the target node;

(D) formatting a response position message component that is associated with a higher-layer protocol, the response position message component containing the determined geographical position of the target node and the radius;

(E) merging the response position message component in a header of a response datagram; and (F) sending the response datagram to the requesting node to determine whether a service area of a geographically-based service is within the radius defined relative to the determined geographical position.

34. The method of claim 25, wherein the target node comprises a wireless terminal.

35. The method of claim 25, wherein (D) comprises:
encrypting the response position message component.

36. A method for supporting a geographical-based service with a service node, comprising:

(A) receiving a reply datagram from each of a plurality of target nodes;

(B) extracting a reply position message component from the received reply datagram that includes a reply service message that is associated with a higher-layer protocol;

(C) determining a corresponding geographical position of each of the plurality of target nodes and a radius associated with a maximum distance from each of the plurality of target nodes from the extracted reply position message component;

(D) receiving a datagram from a requesting node;

(E) extracting a receive position message component from a header of the received datagram, the receive position message component including a receive service message that is associated with the higher-layer protocol, the receive service message containing a service geographical position of the requesting node and a service radius associated with a service maximum distance from the requesting node;

(F) selecting at least one of the plurality of target nodes based on the service geographical position and the service radius of the requesting node and the corresponding geographical position of the plurality of target nodes and the radius;

(G) formatting a response position message component that includes a response service message, the response service message being associated with the higher layer protocol, the response position message component containing a selected geographical position of the selected at least one of the plurality of target nodes;

(H) merging the response position message component in a header of a response datagram; and (I) sending the response datagram to the requesting node.

37. The method of claim 36, further comprising:

(J) for each target node of the plurality of target nodes, formatting a corresponding request service message that is associated with the higher-layer protocol, the corresponding request service message including an indicator that the corresponding geographical position of each target node is being requested;

(K) merging the corresponding request service message with a corresponding request datagram; and (L) sending the corresponding request datagram to each target node.

38. The method of claim 36, wherein the corresponding reply datagram, the receive datagram, and the response datagram comply with an Internet Protocol version 6 specification, and wherein the corresponding reply service message, the receive service message and the response service message comprise an Internet control message protocol version 6 informational message.

39. A computer-readable medium having stored computer executable instructions that when executed perform the method of:

(D) receiving a reply datagram from each of a plurality of target nodes;

(E) extracting a reply position message component from the received reply datagram that includes a reply service message that is associated with a higher-layer protocol;

(F) determining a corresponding geographical position of each of the plurality of target nodes and a radius associated with a maximum distance from each of the plurality of target nodes from the extracted reply position message component;

(D) receiving a datagram from a requesting node;

(E) extracting a receive position message component from a header of the received datagram, the receive position message component including a receive service message that is associated with the higher-layer protocol, the receive service message containing a service geographical position of the requesting node and a service radius associated with a service maximum distance from the requesting node;

(F) selecting at least one of the plurality of the target nodes based on the service geographical position and the service radius of the requesting node and the corresponding geographical position of the plurality of the target nodes and the radius;

(G) formatting a response position message component that includes a response service message, the response service message being associated with the higher layer protocol, the response position message component containing a selected geographical position of the selected at least one of the plurality of target nodes;

(H) merging the response position message component in a header of a response datagram; and (I) sending the response datagram to the requesting node.

* * * * *